(12) United States Patent
Uchida et al.

(10) Patent No.: US 8,419,111 B2
(45) Date of Patent: Apr. 16, 2013

(54) VEHICLE BODY REINFORCING MEMBER

(75) Inventors: Mitsutoshi Uchida, Amagasaki (JP);
Yoshitaka Hattori, Maebashi (JP);
Kenji Moroi, Takanezama Town (JP);
Saburo Inoue, Tokyo (JP); Fumihiko Kikuchi, Tokyo (JP)

(73) Assignees: Nippon Steel & Sumitomo Metal Corporation, Tokyo (JP); H-ONE Co., Ltd., Saitama (JP); Sumitomo Pipe & Tube Co., Ltd., Ibaraki (JP)

( * ) Notice: Subject to any disclaimer, the term of this patent is extended or adjusted under 35 U.S.C. 154(b) by 237 days.

(21) Appl. No.: 12/856,821

(22) Filed: Aug. 16, 2010

(65) Prior Publication Data

US 2011/0031779 A1 Feb. 10, 2011

Related U.S. Application Data

(63) Continuation-in-part of application No. 11/896,329, filed on Aug. 31, 2007, now abandoned, which is a continuation of application No. PCT/JP2006/303219, filed on Feb. 23, 2006.

(30) Foreign Application Priority Data

Mar. 2, 2005 (JP) ................................ 2005-057625

(51) Int. Cl.
*B62D 21/15* (2006.01)
(52) U.S. Cl.
USPC ................................... 296/187.03; 296/146.6
(58) Field of Classification Search ............... 296/146.6, 296/146.5, 146.8, 187.12, 187.03, 155; 49/502
See application file for complete search history.

(56) References Cited

U.S. PATENT DOCUMENTS

| | | | |
|---|---|---|---|
| 3,741,560 A | 6/1973 | Schaller | |
| 5,462,325 A | 10/1995 | Masuda et al. | |
| 5,756,167 A | 5/1998 | Tamura et al. | |
| 5,887,938 A | 3/1999 | Topker et al. | |
| 6,135,537 A | 10/2000 | Giddons | |
| 6,290,282 B1 | 9/2001 | Hortlund et al. | |
| 6,302,458 B1 | 10/2001 | Wang et al. | |
| 6,315,339 B1 | 11/2001 | Devilliers et al. | |

(Continued)

FOREIGN PATENT DOCUMENTS

| | | | |
|---|---|---|---|
| DE | 19633637 | * | 2/1998 |
| EP | 1 340 641 | | 9/2003 |

(Continued)

*Primary Examiner* — Glenn Dayoan
*Assistant Examiner* — Pinel Romain
(74) *Attorney, Agent, or Firm* — Clark & Brody

(57) ABSTRACT

Using as a vehicle body reinforcing member a bent tube with mixed bends of inward and outward projection according to the present invention makes it possible, during a vehicle body collision, to absorb more energy than and exhibit better impact resistance than a vehicle body reinforcing member that uses one of a known straight tube and a curved tube of radius R entirely. Thus the dimensions (outside diameter, wall thickness) of the steel tube that is used as the vehicle body reinforcing member can be reduced, and the tube shape can be modified, while impact resistance is maintained. Modifying the shape in this manner makes it possible to provide the ever higher required level of vehicle body impact resistance at the same time that it reduces the weight of the vehicle body and lowers the cost. The present invention can therefore be widely used as an occupant protection technology.

14 Claims, 21 Drawing Sheets

U.S. PATENT DOCUMENTS

| | | |
|---|---|---|
| 6,349,521 B1 | 2/2002 | McKeon et al. |
| 6,725,700 B2 | 4/2004 | Yogo |
| 6,869,130 B2 | 3/2005 | Bodin et al. |
| 6,910,721 B2 | 6/2005 | Bladow et al. |
| 7,066,525 B2 | 6/2006 | Jaeger et al. |
| 7,530,628 B2 * | 5/2009 | Gabler et al. ............ 296/187.12 |
| 7,581,769 B2 | 9/2009 | Wakabayashi et al. |
| 7,611,175 B2 | 11/2009 | Tornberg |
| 7,735,901 B2 * | 6/2010 | Melz et al. ................ 296/146.6 |
| 2003/0160476 A1 | 8/2003 | Moriyama |
| 2006/0249987 A1 | 11/2006 | Kroll |

FOREIGN PATENT DOCUMENTS

| | | |
|---|---|---|
| JP | 50-15774 | 2/1975 |
| JP | 62-177516 | 11/1987 |
| JP | 04-063242 | 2/1992 |
| JP | 04-280924 | 10/1992 |
| JP | 06-087027 | 3/1994 |
| JP | 08-155568 | 6/1996 |
| JP | 10-236248 | 9/1998 |
| JP | 2002-144872 | 5/2002 |
| JP | 2003-252057 | 9/2003 |
| JP | 2004-051065 | 2/2004 |

* cited by examiner

Bumper Beam

Cross Member Reinforcing Member

Cross Member

10mm x 10mm Cutout

VEHICLE BODY REINFORCING MEMBER

CROSS REFERENCE TO RELATED APPLICATION

This application is continuation-in-part of U.S. application Ser. No. 11/896,329 filed Aug. 31, 2007, now abandoned which is a continuation of International Patent Application No. PCT/JP2006/303219 filed Feb. 23, 2006. The PCT application was not in English as published under PCT Article 21(2).

BACKGROUND OF THE INVENTION

1. Field of the Invention

The present invention relates to a vehicle body reinforcing member that can demonstrate excellent impact resistance during a vehicle body collision and can also reduce the weight of the vehicle body. More specifically, the present invention relates to a vehicle body reinforcing member that can further improve impact resistance during a vehicle body collision by increasing rigidity and improving buckling resistance.

2. Description of the Related Art

In the automobile industry in recent years, the demand for vehicle body safety has increased, and the development of technologies to protect occupants during a collision has been promoted. In conjunction with these trends, the structure of every part of the vehicle body, including the doors, has been revised to improve occupant protection performance, and the use of reinforcing members to protect occupants has been studied.

For example, FIG. 1 is a drawing that shows a vehicle body structure that uses reinforcing members in an automobile door as door impact bars. A door 1 is an automobile door that is structured such that a window frame 3 is integrally formed as a one-piece with an upper portion of a door inner 2, and a door outer (not shown in the figure) is joined to an outer side of the door inner 2. Further, a front edge of the door 1 (on the left side of the figure) is attached to a vehicle body 4 by upper and lower hinges 5a, 5b. At a rear edge of the door (on the right side of the figure), a door lock 6 is provided at a middle height level of the door inner 2. This structure allows the door to open and close freely, and to be held by the door lock 6 when closed.

The door impact bars (reinforcing members) 7 have brackets 8 at both ends to join them to the vehicle body. In the structure of the reinforcing members shown in FIG. 1, the brackets 8 are joined to the hinges 5 and the door lock 6. Therefore, the structure is such that one of the door impact bars 7 is mounted between the portion where the upper hinge 5a is attached and the portion where the door lock 6 is attached, and the other door impact bar 7 is mounted between the portion where the lower hinge 5b is attached and the portion where the door lock 6 is attached.

The structure of the reinforcing members shown in FIG. 1 is such that the brackets that are used for joining the reinforcing members to the vehicle body are provided at the ends of tubes. However, another structure that may be used is a so-called bracketless structure in which the brackets are not provided at both ends of the reinforcing members, and both ends of the reinforcing members are joined directly to the vehicle body.

Recently, due to automobile fuel economy regulations and the need to reduce costs, the demand to reduce the weight of an automobile body has become stronger. Therefore, the demand to promote weight reduction has become stronger even for reinforcing members that increase safety. A variety of proposals have been made to address this demand.

In Japanese Patent No. 2811226, proposed is a steel tube for reinforcing a vehicle body that reduces weight by using a high-strength steel tube or steel sheet as a reinforcing member. The steel tube for reinforcing a vehicle body has a tensile strength of at least 120 kgf/mm$^2$ (1180 MPa) and an elongation of at least 10%, and it is used as a door impact bar that is a steel tube for reinforcing a door, or as a bumper core material, and the like. The above characteristics of the steel tube is perceived to result in that by selecting a steel tube shape in relation to the use conditions, the steel tube for reinforcing a vehicle body can be made lighter in weight and can effectively absorb impact energy.

Furthermore, in Japanese Patent Application Publication No. 2002-144872, a door structure is proposed in which an impact bar is arranged such that it is inclined in the longitudinal direction of the vehicle body and a portion of the impact bar that faces a door outer panel is curved along and in the proximity of a curved surface of the door outer. If the proposed door structure is used, while tensile stiffness and bending resistance in relation to an impact load are imparted to the impact bar, compression resistance is additionally obtained, ensuring sufficient strength without using such methods as enlarging the cross section shape of the impact bar, increasing its thickness, and the like.

Also, in Japanese Patent Application Publication No. 04 (1992)-280924, a method is disclosed for heating a straight steel pipe by direct electric resistance heating and hardening the steel pipe by spraying it with liquid coolant while pressing a die such that the steel pipe takes a desired curved shape, so as for a door guard beam to follow the contour of a rounded shape of a door by bending the pipe. The method focuses on the fact that, for reasons of automobile design, an automobile door tends to have a rounded shape.

SUMMARY OF THE INVENTION

For a vehicle body reinforcing member that uses a steel tube as described above, there are limits to using a high-strength steel tube as the reinforcing member as a way to respond to the demand for vehicle body weight reduction. Therefore, to provide better impact resistance, an attempt has been made to utilize constraint in the axial direction by curving the reinforcing member along a curved surface of a door outer of a door frame.

As shown in FIG. 1, a door impact bar, as one type of automobile body reinforcing member, is provided with brackets at both ends as necessary, and is joined to a highly rigid vehicle body through hinges and a door lock portion. Thus the actual length of the impact bar along the curved surface is greater than the linear distance between the points where the ends of the impact bar are joined to the vehicle body.

Therefore, when an impact load is exerted on the impact bar during a side collision onto the side surface of the door frame, the impact load is dispersed forwards and backwards in the vehicle body, in a longitudinal direction of the impact bar, causing opposite ends of the impact bar to stretch forwards and backwards in the vehicle body, in a longitudinal direction of the impact bar. It is thus possible to increase the load at which the impact bar starts to deform, which also increases the amount of energy that is absorbed, so the impact resistance is markedly improved.

[Deformation Behavior of Conventional Impact Bar]

FIG. 2 is a figure that shows results of three-point bending tests when a straight tube and a tube that is bent at a constant bending radius R over its entire length (hereinafter, referred to as "curved tube of radius R entirely") are used as impact bar test pieces. FIG. 2A shows the variations in the loads borne by an indenter in relation to the displacement (in millimeters, mm) of the indenter. FIG. 2B shows the trends in the amounts of energy absorbed, which are equivalent to the integration values of the loads borne by the indenter, in relation to the displacement (mm) of the indenter.

The test materials were tube test pieces with an outside diameter of 31.8 mm, a wall thickness of 1.8 mm, a length of 1000 mm, and a tensile strength of 1500 MPa. The bending radius R of the "curved tube of radius R entirely" was 5000 mm. Furthermore, the three-point bending tests were conducted using a three-point bending test machine, with opposite ends of each of test pieces supported constrainedly, so as to be able to evaluate the deformation behavior of an actual impact bar that is joined to a vehicle body.

According to the results shown in FIG. 2, the deformation behavior exhibited by the straight tube is such that, as the displacement of the indenter increases, the load that exerts on the indenter increases until it reaches a maximum load, then gradually decreases. The turnaround to a decreasing load halfway through the indenter displacement occurs because the test piece can no longer bear the load and starts to either flatten or buckle.

In contrast, the "curved tube of radius R entirely" shows a rapid increase in the load exerted on the indenter when deformation starts, followed by a decrease after a maximum value is reached and then by the identical deformation behavior to that of the straight tube. Therefore, using the "curved tube of radius R entirely" makes it possible to increase the load at which deformation starts, thus enabling to increase the amount of absorbed energy and to improve the impact resistance.

Incidentally, because awareness of environmental protection has increased recently, the demand for automobile body weight reduction has become even stronger. Therefore, the demands for studies of thoroughgoing weight reduction and improved stability of impact resistance quality have become stronger, even for reinforcing members that increase safety.

For example, in a case where a "curved tube of radius R entirely" is processed, if a door guard beam bending method described in Japanese Patent Application Publication No. 04 (1992)-280924 is used, the method is to heat a straight steel pipe by direct electric resistance heating and harden the steel pipe by spraying it with liquid coolant while pressing a die against the pipe. This method makes it difficult to achieve uniform cooling and hardening over the entire length and circumference of the reinforcing member, so uneven hardening becomes a concern.

Therefore, the quality of the door guard beam created by the bending process described in Japanese Patent Application Publication No. 04 (1992)-280924 is unstable, due to the uneven hardening. The non-uniform deformation makes it impossible to ensure dimensional precision and shape fixability, so a product with the required stability of impact resistance quality cannot be achieved.

[Limits to "Curved Tube of Radius R Entirely" as Vehicle Body Reinforcing Member]

Furthermore, a "curved tube of radius R entirely", used as a vehicle body reinforcing member, can absorb more energy than the known straight tube and can improve the impact resistance to a certain extent. However, with regard to automobile performance, demands for further weight reduction, lower fuel consumption, more occupants compartment space, and improved safety have become even stronger. In order to respond to these demands, the vehicle body reinforcing member must have even better energy absorption characteristics and better overall impact resistance quality.

It is an object of the present invention to address the problems described above so as to provide a vehicle body reinforcing member with impact resistance that is superior to that of a vehicle body reinforcing member with the use of a known straight tube, and most of all, to provide a vehicle body reinforcing member with impact resistance that is superior to the impact resistance of a vehicle body reinforcing member with the use of a curved tube of radius R entirely, wherein the weight of the member is reduced, the energy absorption characteristics during a vehicle body collision is improved, and the stability of impact resistance quality is achieved.

In order to achieve the objectives described above, the inventors thoroughly examined the deformation behavior of vehicle body reinforcing members that had a variety of different shapes. As shown in FIG. 2, the "curved tube of radius R entirely" exhibits better energy absorption characteristics than does the straight tube. However, when an attempt was made to further improve the energy absorption characteristics, it was discovered that there are limits to extending the technological concept (active effect) of the "curved tube of radius R entirely".

Specifically, the active effect of the "curved tube of radius R entirely" is to cause the load that is borne by the vehicle body reinforcing member to reach its maximum immediately after the impact load is exerted to the vehicle body reinforcing member, as shown in FIG. 2A, thereby increasing the amount of absorbed energy, as shown in FIG. 2B. Thus, in the case where the "curved tube of radius R entirely" is used, the deformation behavior (borne load characteristics) after the borne load reaches its maximum is exactly the same as that of the straight tube. Therefore, the question of how to increase the amount of energy that the vehicle body reinforcing member absorbs comes down to how to cause the borne load to reach its maximum immediately after the impact.

The inventors, while keeping in mind the increasing of the borne load as much as possible immediately after the impact, focused their attention on the start of the buckling of the vehicle body reinforcing member, regardless of the maximizing of the borne load immediately after the impact, which had been neglected and abandoned not only in the case where the straight tube was used but also in the case where the "curved tube of radius R entirely" was used. Specifically, the inventors focused on the question of how it would be possible to delay the start of the buckling of the vehicle body reinforcing member. In other words, the inventors thought that if the start of the buckling could be delayed, it would be possible to improve the energy absorption characteristics of the vehicle body reinforcing member.

In the case where the "curved tube of radius R entirely" is used, the reason that the borne load reaches its maximum immediately after the impact is that the vehicle body reinforcing member is curved over its entire length in the opposite direction relative to the impact load (projected toward the outside of the vehicle body). However, the inventors conceived of providing a bend that is curved in the opposite direction relative to the impact load (projected toward the outside of the vehicle body) (hereinafter called an "outwardly projecting bent portion") at the location that receives the impact load and providing, adjacent to the location that receives the impact load, a straight portion or a bend that is curved in the direction of the impact load (projected toward the inside of the vehicle body) (hereinafter called an "inwardly projecting bent portion").

Specifically, the inventors found that although the "outwardly projecting bent portion" can withstand the borne load to a certain extent with respect to the impact load, the "outwardly projecting bent portion" should not be intended to be used to try to maximize the borne load. The inventors also found that it would be effective to disperse the borne load promptly to the inwardly projecting bent portion and/or the straight portion, which are not effective for the impact load.

In other words, while excessive deformation of the vehicle body reinforcing member under the impact load is prevented by the "outwardly projecting bent portion", the impact load is dispersed to the "inwardly projecting bent portion" or the straight portion adjacent to the "outwardly projecting bent portion". The reason this is done is that it was found that dispersing the load exerted on the "outwardly projecting bent portion", which is the point on which the load acts, such that the impact load is borne over the wide range of the entire vehicle body reinforcing member, makes it possible to delay the start of the buckling of the vehicle body reinforcing member as a result.

Test results based on the findings described above are shown in FIG. 7, which is described later. The after-mentioned FIG. 7 shows results of three-point bending tests that used test pieces of the "curved tube of radius R entirely" and a bent tube that has a partial bend that is bent with a bending radius R (hereinafter called a "bent tube with a partial bend of radius R"). As it shows, using the "bent tube with a partial bend of radius R" or the like makes it possible to delay the start of the buckling, which in turn makes it possible to increase the amount of energy that is absorbed. The mechanism by which this is accomplished will be explained below.

[Preliminary Study of "Curved Tube of Radius R Entirely" and "Bent Tube with a Partial Bend of Radius R"]

FIG. 3 is an explanatory figure of the overall shapes of the "curved tube with mono-radius R entirely" and the "bent tube with a partial bend of radius R", which said tubes are used as vehicle body reinforcing members. FIG. 3A shows the "curved tube of radius R entirely", and FIG. 3B shows the "bent tube with a partial bend of radius R". In a case where such a tube with radius is mounted in a door frame as a vehicle body reinforcing member, the impact bar is provided with an overall length W and a projection distance σ that allow it to be accommodated within the clearance space of the door frame.

The "curved tube of radius R entirely" shown in FIG. 3A has a single bending radius R0 over the entire length of the member. The "bent tube with a partial bend of radius R" shown in FIG. 3B is formed with an outwardly projecting bent portion with a bending radius R1 at one location in a middle length portion of the reinforcing member. The portions adjacent to the bent portion on both sides are structured as straight portions.

FIG. 4 is a figure that shows results of three-point bending tests when the "curved tube of radius R entirely" and the "bent tube with a partial bend of radius R" are used as test pieces. FIG. 4A shows the variations in the loads borne by the indenter in relation to the displacement (mm) of the indenter. FIG. 4B shows the trends in the amounts of absorbed energy, which are equivalent to the numeric integration values of the loads borne by the indenter, in relation to the displacement (mm) of the indenter.

The test materials were tube test pieces with an outside diameter of 31.8 mm, a wall thickness of 1.8 mm, a length of 1000 mm, and a tensile strength of 1500 MPa. The bending radius of the "curved tube of radius R entirely" was 6200 mm. The curvature 1/R of the "bent tube with a partial bend of radius R" was set to 0.8 m$^{-1}$. The tests were conducted using a three-point bending test machine, with opposite ends of each of the test pieces supported constrainedly. Here, the curvature indicates the extent of the bending of the bent portion of the member and is represented by 1/R when the bending radius of the bent portion is R.

As shown in FIG. 4, for the "bent tube with a partial bend of radius R", the start of the buckling after the maximum impact load is reached comes later than for the "curved tube with mono-radius entirely", and the amount of absorbed energy thereof, as shown by the value of integral of the accompanying borne load, is greater than for the "curved tube of radius R entirely". The test results shown in FIG. 4 also indicate that the maximum load tends to be slightly higher for the "bent tube with a partial bend of radius R". These effects make it possible for the "bent tube with a partial bend of radius R" to exhibit superior impact resistance characteristics.

The delay in the start of the buckling of and the accompanying increase in the amount of absorbed energy by the "bent tube with a partial bend of radius R" are dependent on the curvature 1/R of the "bent tube with a partial bend of radius R". Specifically, increasing the curvature 1/R, that is, decreasing the bending radius R of the bent portion makes it possible to increase the amount of absorbed energy.

FIG. 5 is a figure that shows an effect of the curvature 1/R of the "bent tube with a partial bend of radius R", with reference to the characteristics of the "curved tube of radius R entirely" (bending radius 6200 mm). FIG. 5A shows the ratio of the maximum load on the "bent tube with a partial bend of radius R" to the maximum load on the straight tube when the curvature 1/R of the "bent tube with a partial bend of radius R" is set to 0.4, 0.8, and 2.0 respectively. The ratio of the maximum load on the "curved tube of radius R entirely" (bending radius 6200 mm) to the maximum load on the straight tube is shown as a reference.

In the same manner, FIG. 5B shows the ratio of the absorbed energy by the "bent tube with a partial bend of radius R" to that by the straight tube when the curvature 1/R of the "bent tube with a partial bend of radius R" is set to 0.4, 0.8, and 2.0. The ratio of the absorbed energy by the "curved tube of radius R entirely" (bending radius 6200 mm) to the energy absorbed by the straight tube is shown as a reference.

The test results shown in FIG. 5 indicate that when the curvature 1/R of the "bent tube with a partial bend of radius R" is small, the ratio of the maximum load on the "bent tube with a partial bend of radius R" to the maximum load on the straight tube remains at a low value, as does the ratio of the absorbed energy by the "bent tube with a partial bend of radius R" to that by the straight tube. However, increasing the curvature 1/R of the "bent tube with a partial bend of radius R" to at least 0.8 m$^{-1}$, for example, allows the "bent tube with a partial bend of radius R" to exhibit characteristics that are superior to those exhibited by the "curved tube of radius R entirely" (bending radius 6200 mm).

[Comparison Between Preliminary Study and "Bent Tube with Multiple Bends of Radius R" of the Invention]

As described above, using the "bent tube with a partial bend of radius R" makes it possible to delay the start of the buckling that accompanies the exertion of the impact load and to increase the amount of absorbed energy. However, as shown in FIG. 4A, a phenomenon is observed in which the ramp load in the initial loading period thereof is lower than for the "curved tube of radius R entirely", thus creating concern that the impact resistance will also be lower.

In order to prevent this, using a bent tube that is provided with inwardly projecting bent portions, reversely bent portions, adjacent to outwardly projecting partial bent portions at a plurality of locations along the entire length of the member (hereinafter called a "bent tube with mixed bends of inward and outward projection") makes it possible to achieve a ramp load in the initial loading period that is at least equivalent to that achieved by the "curved tube of radius R entirely", while allowing the start of buckling to be delayed to thereby increase the amount of absorbed energy.

FIG. 6 is an explanatory figure of an overall shape of the "bent tube with mixed bends of inward and outward projection" that can be used as a vehicle body reinforcing member. The "bent tube with mixed bends of inward and outward projection" in FIG. 6 has outwardly projecting bent portions with a bending radius R1 (curvature 1/R1) at three locations, and is structured to have inwardly projecting bent portions, reversely bent portions, with a bending radius R2 (curvature 1/R2), between the outwardly projecting bent portions. The tube is provided with an overall length W and a projection distance σ that allow it to be accommodated within the clearance space of the door frame.

In the three-point bending test, deformation is ordinarily concentrated only in the vicinity of the point on which the load acts, where the indenter is in contact with the test piece. However, the inwardly projecting bent portions as shown in FIG. 6 provide relatively weak portions, such that the deformation caused by the load can be dispersed. Because of this effect, in the "bent tube with mixed bends of inward and outward projection", absorption of the strain energy that is associated with the impact undergoes over a wider range. The concentration of deformation at the point on which the load acts can therefore be moderated, and the displacement prior to the start of the buckling can be significantly increased.

FIG. 7 is a figure that shows results of three-point bending tests when the "curved tube of radius R entirely", the "bent tube with a partial bend of radius R" and the bent tube with mixed bends of inward and outward projection" are used as test pieces. FIG. 7A shows the variations in the loads borne by the indenter in relation to the displacement (mm) of the indenter. FIG. 7B shows the trends in the amounts of absorbed energy, which are equivalent to the values of integral of the loads borne by the indenter, in relation to the displacement (mm) of the indenter.

The test pieces were made of tube materials with an outside diameter of 31.8 mm, a wall thickness of 1.8 mm, a length of 1000 mm, and a tensile strength of 1500 MPa. The bending radius of the "curved tube of radius R entirely" was 6200 mm. For the "bent tube with a partial bend of radius R", the curvature $1/R$ was set to 0.8 $m^{-1}$. The "bent tube with mixed bends of inward and outward projection" had the shape that is shown in FIG. 6, the curvature $1/R1$ of each outwardly projecting bent portion was set to 2.0 $m^{-1}$ ($R1$: 500 mm), and the curvature $1/R2$ of each inwardly projecting bent portion, reverse bent portion, was set to 1.0 $m^{-1}$ ($R2$: 1000 mm). The tests were conducted using a three-point bending test machine, with both ends of each of the test pieces supported constrainedly.

As shown in FIG. 7, using the "bent tube with mixed bends of inward and outward projection" makes it possible to ensure a ramp load in the initial loading period that is equivalent to that of the "curved tube of radius R entirely". In addition, the start of the buckling can be delayed, so the amount of absorbed energy can be increased.

FIG. 8 is a figure that shows an effect of the plural portions that are outwardly bent and the plural portions that are inwardly bent in the opposite direction, reversely bent, that are provided in the "bent tube with mixed bends of inward and outward projection", with reference to the characteristics of the "curved tube of radius R entirely" (bending radius 6200 mm), whereas ratios of the absorbed energy of the "bent tube with mixed bends of inward and outward projection" to those of straight tube and "curved tube of radius R" are shown. FIG. 8A shows the absorbed energy when the displacement of indenter is 200 mm, whereas FIG. 8B does for 125 mm.

As shown in FIG. 8, in the "bent tube with mixed bends of inward and outward projection, effects of the inwardly projecting portions, reversely bent portions, as delaying the start of buckling to thereby increase the absorbed energy are observed.

Meanwhile, in the "bent tube with mixed bends of inward and outward projection, as the number of bent portions with inward and outward projection increases, although the effect on delaying the start of buckling is decreased, a ramp load in the initial loading can be increased. For reasons of this, in case of small indenter displacement, the effect of increasing the ramp load in the initial loading is dominantly required, while in case of large indenter displacement, the effect of delaying the start of buckling becomes dominant.

Therefore, the "bent tube with mixed bends of inward and outward projection" of the invention entails providing bent portions with inward and outward projection at a plurality of locations that can increase the ramp load in the initial loading, whereas it is preferable to provide mixed bends with inward and outward projection at three to seven locations.

Normally, when a vehicle body reinforcing member is used for a door beam, it is mandatory that a side collision should not cause the affected member to deflect up to the position where an occupant stays, and an allowable deflection is considered to be 100 to 150 mm.

Consequently, in case a "bent tube with mixed bends of inward and outward projection" is used for a door beam as a vehicle body reinforcing member, it becomes necessary to provide bent portions with inward and outward projection at two locations or more. This is shown based on the result of three-point-bending test.

FIG. 9 is a figure that shows results of three-point bending tests when the "curved tube of radius R entirely" and the "bent tube with mixed bends of inward and outward projection (a single outwardly projecting bend)" are used as test pieces. FIG. 9A shows the variations in the loads borne by the indenter in relation to the displacement (mm) of the indenter. FIG. 9B shows a trend in the amounts of absorbed energy, which are equivalent to the values of integral of the loads borne by the indenter, in relation to the displacement (mm) of the indenter.

The test pieces were made of tube materials with an outside diameter of 31.8 mm, a wall thickness of 1.8 mm, a length of 1000 mm, and a tensile strength of 1500 MPa. The bending radius of the "curved tube of radius R entirely" was 6200 mm. The "bent tube with mixed bends of inward and outward projection" had the shape that has an outwardly projecting bend at one location with its curvature $1/R1$ being set to 2.0 $m^{-1}$ ($R1$: 500 mm), along with inwardly projecting bends each with the curvature $1/R2$ being set to 1.0 $m^{-1}$ ($R2$: 1000 mm). The tests were conducted using a three-point bending test machine, with both ends of each of the test pieces supported constrainedly.

As shown in FIG. 9A, although the "bent tube with mixed bends of inward and outward projection" that has a single outwardly projecting bend and adjacent to this, has inwardly projecting bends, reversely bent portions, could not increase a ramp load in the initial loading, it could delay the start of buckling compared with that of the "curved tube of radius R entirely".

In this regard, as shown in FIG. 9B, in the "bent tube with mixed bends of inward and outward projection" that has a single outwardly projecting bend and adjacent to this, has inwardly projecting bends, there is shown a trend that the absorbed energy relative to the indenter displacement (mm) until the start of buckling remains at a lower level than that of the "curved tube of radius R entirely", but in association with the delay of the start of buckling, the absorbed energy keeps increasing and turns the trend around.

As such, when such the "bent tube with mixed bends of inward and outward projection" that has a single outwardly projecting bend and adjacent to this, has inwardly projecting bends is used to ensure a sufficient absorbed energy, a large indenter displacement becomes necessary. Consequently, in case a "bent tube with mixed bends of inward and outward projection" is used as the vehicle body reinforcing member where a smaller collision-incurred deflection thereof is desirable, it becomes inevitable to have bent portions with inward and outward projection at two locations or more, respectively.

The mechanism by which the "bent tube with mixed bends of inward and outward projection" exhibits its superior effect can be explained by analyzing the distribution of the strain energy density (kN·mm/kg). Portions where great strain energy is localized are likely to buckle, so distributing the strain energy over a wide range with respect to a load imposed from outside makes it possible to enhance the delay in the start of the buckling.

FIG. 10 is a figure that shows in a simulated condition the results of analyses on the distribution of the strain energy density (kN·mm/kg) in three-point bending tests that use, as test pieces, the "curved tube of radius R entirely", the "bent tube with a partial bend of radius R", and the "bent tube with mixed bends of inward and outward projection". FIG. 10A shows the result for the "curved tube of radius R entirely". FIG. 10B shows the result for the "bent tube with a partial bend of radius R". FIG. 10C shows the result for the "bent tube with mixed bends with inward and outward projection". Test pieces 7 are the same ones that were used for the three-point bending tests shown in FIG. 7. The shaded areas in FIG. 10 indicate the distribution areas where the strain energy density associated with the load of the indenter 9 is at least 4500 kN·mm/kg.

According to the detailed analysis of the distribution of the strain energy density (kN·mm/kg), it is understood that using the "bent tube with mixed bends of inward and outward projection" narrows the distribution area where the strain energy density is at least 4500 kN·mm/kg in the vicinity of the loading point, indicating that the strain energy is spread and divvied up over a wide range other than that area.

Specifically, in the "bent tube with mixed bends of inward and outward projection", the inwardly projecting bent portions exhibit an effect of mitigating the impact, so the strain energy is not concentrated in the outwardly projecting bent portion that is the position where the load is applied. As a result, a large displacement can be expected up to the point when the buckling starts, so the amount of absorbed energy can be increased.

In addition to the findings described above, the inventors showed that configuring the cross section shape of the vehicle body reinforcing member to be a circle, an oblong, or a shape that is similar to a circle or an oblong is an effective way to ensure even better buckling strength. The inventors also showed that a combination of successive incremental heating using high-frequency induction heating, successive incremental bending, and successive incremental uniform cooling was an effective way to form the outwardly projecting bent portions at a plurality of locations in the member, as well as to form the inwardly projecting bent portions or the straight portions adjacent to each outwardly projecting bent portion.

The present invention was completed based on the findings described above, and the vehicle body reinforcing member is summarized in paragraphs (1) to (5) below.

(1) The vehicle body reinforcing member is made of a steel tube that is attached to the automobile body for impact resistance. The vehicle body reinforcing member includes, at a plurality of locations along the length-wise direction of the vehicle body reinforcing member, bent portions that project outwardly in relation to the outer surface of the vehicle body, and on one or each side adjacent to said bent portion, also includes a bend that projects inwardly, reverse bent portion, in relation to the outer surface of the vehicle body. In other words, the vehicle body reinforcing member is the "bent tube with mixed bends of inward and outward projection".

(2) In the vehicle body reinforcing member described in paragraph (1), it is desirable for the curvature of at least one outwardly projecting bent portion at the location that receives impact from outside the vehicle body to be at least 0.8 m$^{-1}$. Furthermore, an end portion of the vehicle body reinforcing member can be structured to be a straight portion, or another outwardly projecting bent portion that has a different curvature from that of said first outwardly projecting bent portion, or otherwise, an inwardly projecting bent portion that has a different curvature from that of said first outwardly projecting bent portion.

(3) In the vehicle body reinforcing member described in paragraphs (1) and (2) above, it is desirable for the cross section shape of the steel tube as the starting material for the vehicle body reinforcing member to be one of a circle, an oblong, a shape that is similar to a circle, and a shape that is similar to an oblong.

(4) In the vehicle body reinforcing member described in paragraphs (1) to (3) above, it is desirable for the outwardly projecting bent portion(s) and the inwardly projecting bent portions to be formed, while moving successively in the axial direction a steel tube as the starting material, by using a high-frequency induction heating coil that is arranged around an outer circumference of the steel tube to heat a localized portion of the steel tube to a temperature range in which plastic deformation is possible and a temperature range in which hardening is possible, then forming the bent portion by imparting a bending moment to the heated portion, immediately followed by rapidly cooling the heated portion.

(5) For the vehicle body reinforcing member described in paragraphs (1) to (4) above, the vehicle body reinforcing member can be arranged in any part of the vehicle body to protect an occupant during a collision and for example, can be used as a door impact bar.

The vehicle body reinforcing member according to the present invention, the "bent tube with mixed bends of inward and outward projection" can, during a vehicle body collision, absorb more energy than and exhibit better impact resistance than a vehicle body reinforcing member that uses the known straight tube or the "curved tube of radius R entirely".

Thus the dimensions (outside diameter, wall thickness) of the steel tube that is used as the vehicle body reinforcing member can be reduced, and the tube shape can be revised, while impact resistance is maintained. It is also possible to provide the ever higher required level of vehicle body impact resistance at the same time that the vehicle body weight is reduced and the cost is lowered.

BEST MODE FOR CARRYING OUT THE INVENTION

A vehicle body reinforcing member according to the present invention will be explained with reference to the drawings.

[Examples of Shapes of a "Bent Tube with Mixed Bends of Inward and Outward Projection"]

FIG. 11 is a figure that shows examples of shapes of the "bent tube with mixed bends of inward and outward projection" according to the present invention. The "bent tube with mixed bends of inward and outward projection" in FIG. 11A has outwardly projecting bent portions with a bending radius R1 (curvature 1/R1) at four locations. On an end adjacent to each outwardly projecting bent portion, an inwardly projecting bent portions with a bending radius R2 (curvature 1/R2), or a straight portion is provided. Even in this case, the tube has an overall length W and a projection distance σ to allow it to be arranged in the clearance space of a door frame. In FIG. 11, the upward direction on the sheet indicates the outward direction in the door frame.

Figure 6:
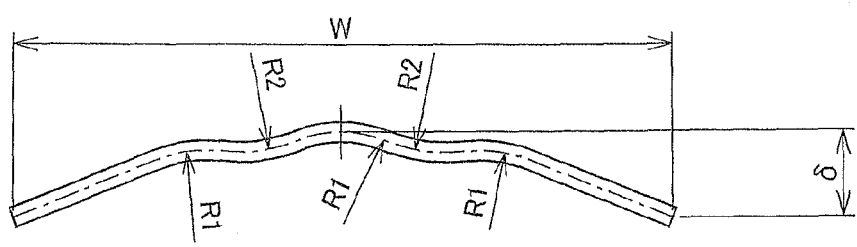
FIG. 6 is an explanatory figure of an overall shape of a "bent tube with mixed bends of inward and outward projection", which tube can be used as a vehicle body reinforcing member.
Figure 7A:
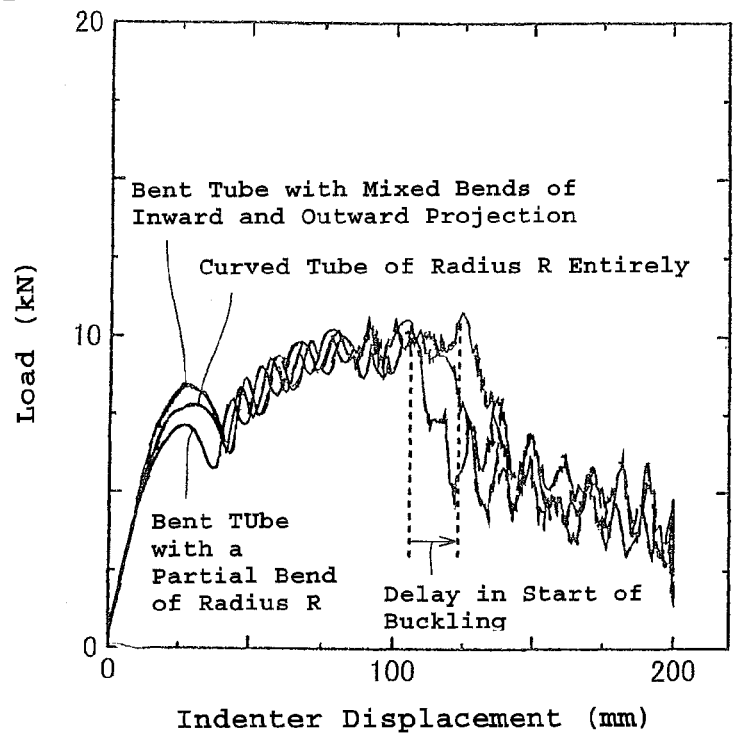
FIG. 7 is a figure that shows results of three-point bending tests when the "curved tube of radius R entirely", the "bent tube with a partial bend of radius R" and the "bent tube of mixed bends of inward and outward projection" are used as test pieces.
Figure 7B:
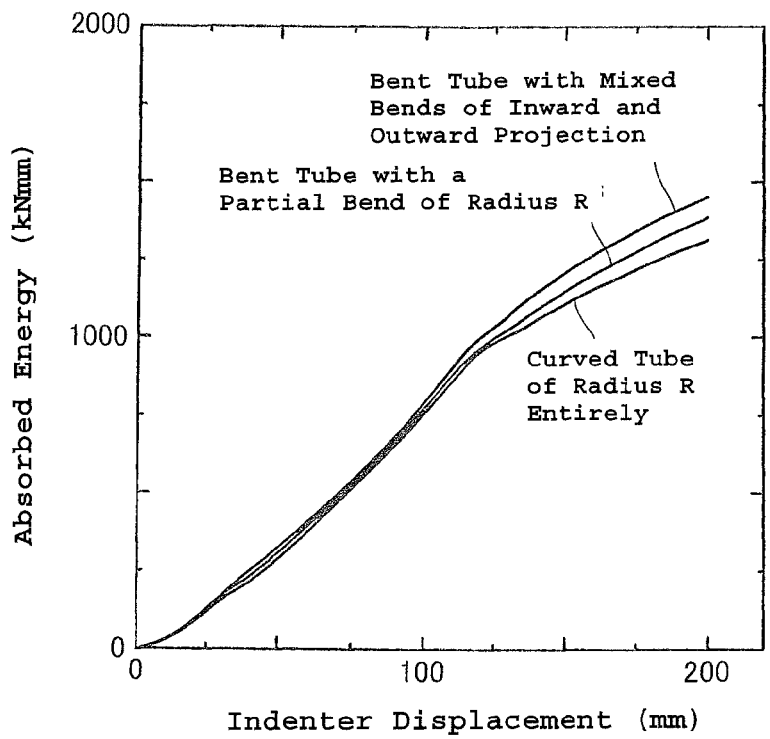
Figure 8A:
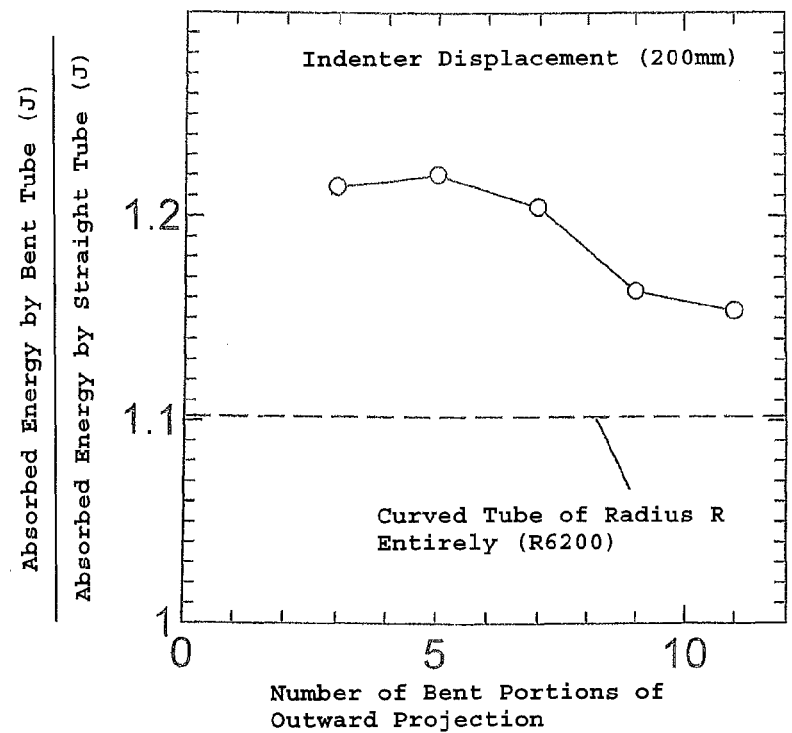
FIG. 8 is a figure that shows an effect of a plurality of outwardly projecting bends and inwardly projecting bends, i.e. reverse bent portions, provided in the "bent tube with mixed bends of inward and outward projection, with reference to the characteristics of the "curved tube of radius R entirely (bending radius 6200 mm)"
Figure 8B:
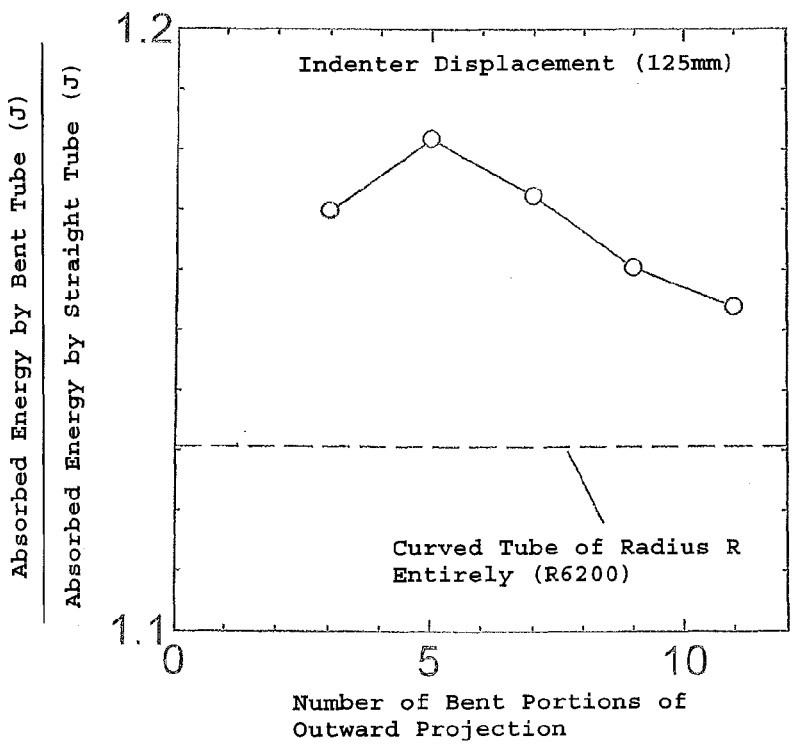
Figure 9A:
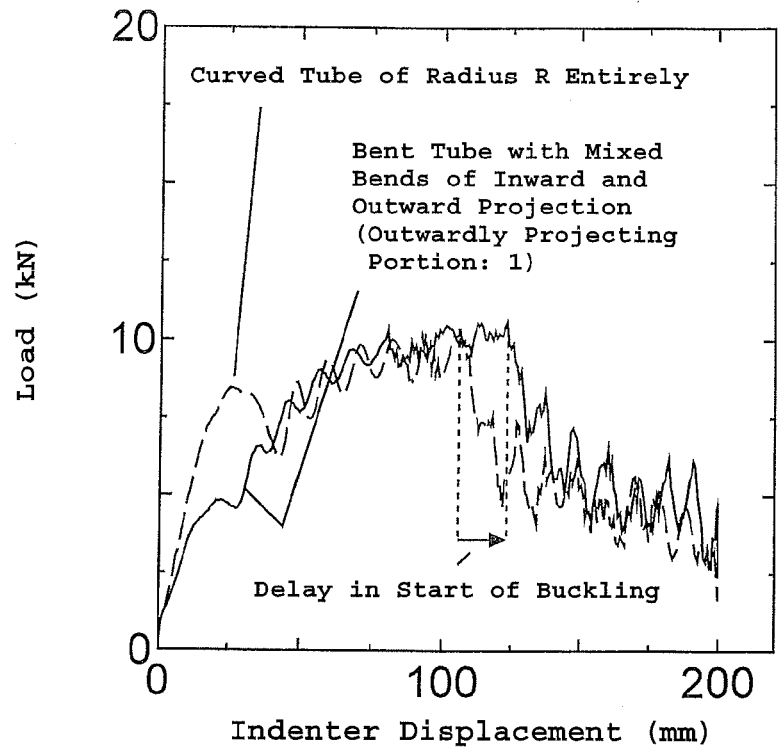
FIG. 9 is a figure that shows results of three-point bending tests using a "bent tube with mixed bends of inward and outward projection (having a single outwardly projecting bend)" as a test piece.
Figure 9B:
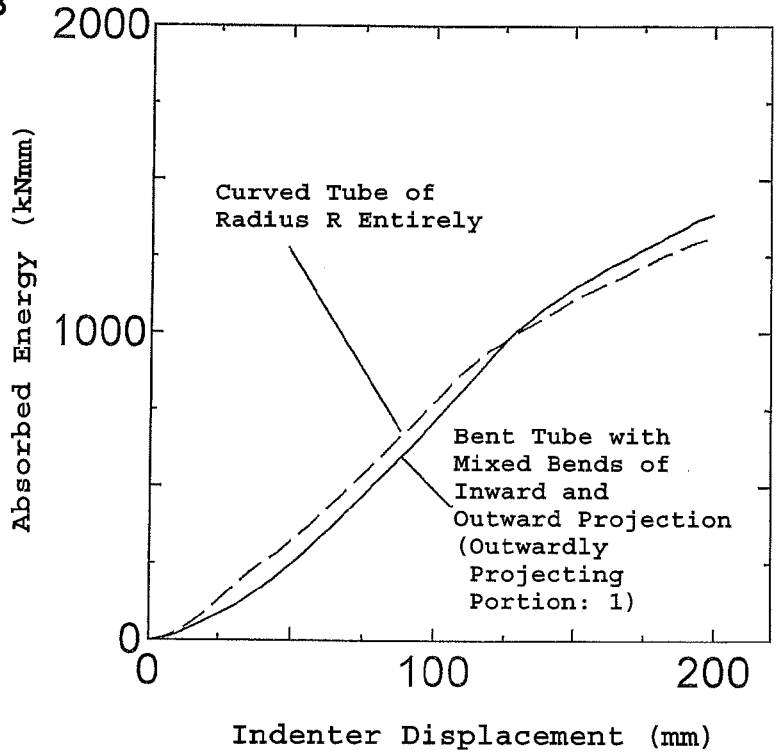
Figure 10A:
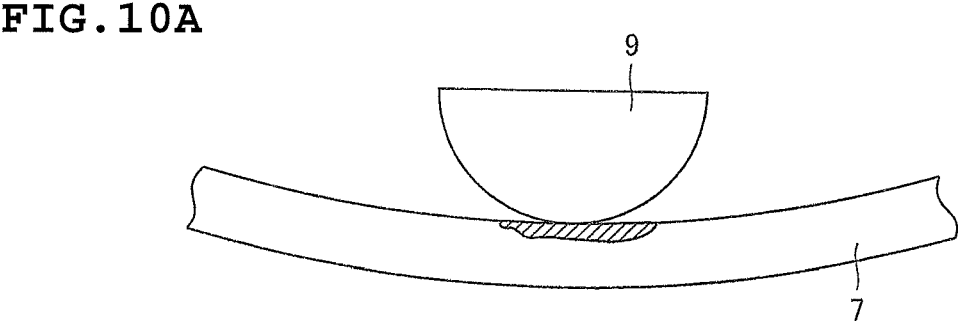
FIG. 10 is a figure that in a simulated condition shows the results of analyses on the distribution of strain energy density (kN·mm/kg) in three-point bending tests that use test pieces of the "curved tube of radius R entirely", the "bent tube with a partial bend of radius R", and the "bent tube with mixed bends of inward and outward projection"
Figure 10B:
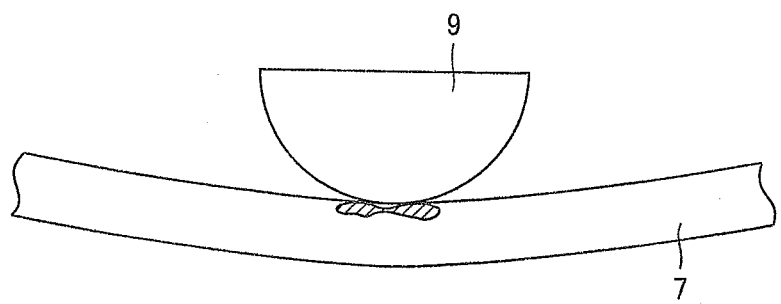
Figure 10C:
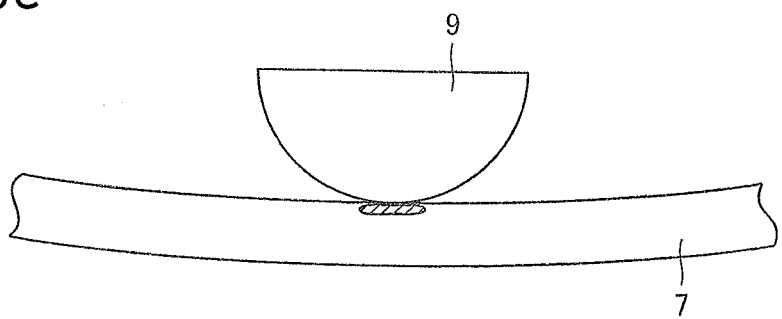
Figure 11A:
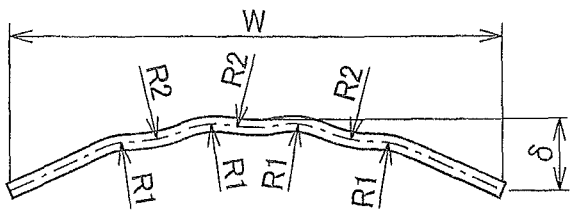
FIG. 11 is a figure that shows examples of shapes of the "bent tube with mixed bends of inward and outward projection" among vehicle body reinforcing members according to the present invention.
Figure 11B:
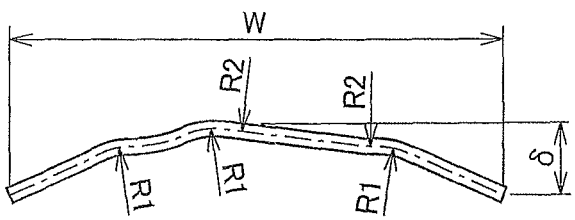
Figure 11C:
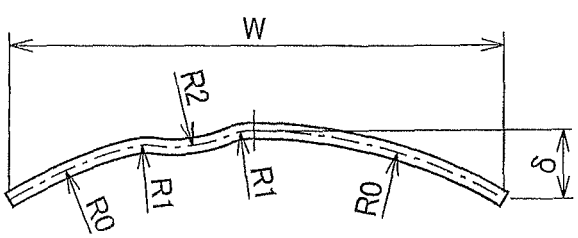
Figure 11D:
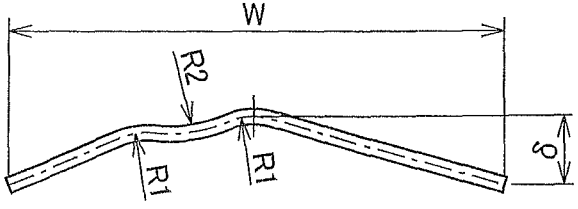
Figure 11E:
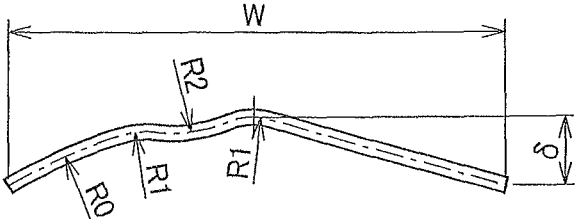
Figure 11F:
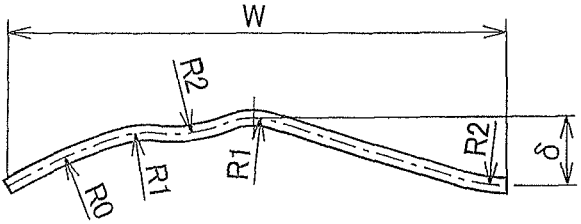

In a similar manner as shown in FIG. 6, each of the "bent tube with mixed bends of inward and outward projection" shown in FIGS. 11B to F has outwardly projecting bent portions each with a bending radius R1 (curvature 1/R1) at two or three locations. On a side adjacent to each of the outwardly projecting bent portions, an inwardly projecting bent portion, reversely bent, with a bending radius R2 (curvature 1/R2) or a straight portion is provided.

In FIG. 11, for descriptive purposes, the outwardly projecting bent portions are shown with a bending radius R1 each, and the inwardly projecting bent portions are shown with a bending radius R2 each. However, it is not necessary for the individual bent portion to use the same bending radius, and an appropriate different bending radius can be used. For example, as shown in FIGS. 11C, E and F, the bent portion(s) with a greater bending radius R0 can be provided in the end portion(s) of the member. In addition, an inwardly projecting bent portion with a greater bending radius can be provided. Note that in FIG. 11, it is defined that R0 is greater than R2 and so is R2 than R1.

In the "bent tube with mixed bends of inward and outward projection" shown in FIG. 11, the inwardly projecting bent portion is the region that is relatively weak with respect to impact, so it can disperse the impact load. This makes it possible for the member to bear over a wider range the strain energy that accompanies an impact, so the start of buckling can be significantly delayed, and the amount of absorbed energy can be further increased.

Figure 5A:
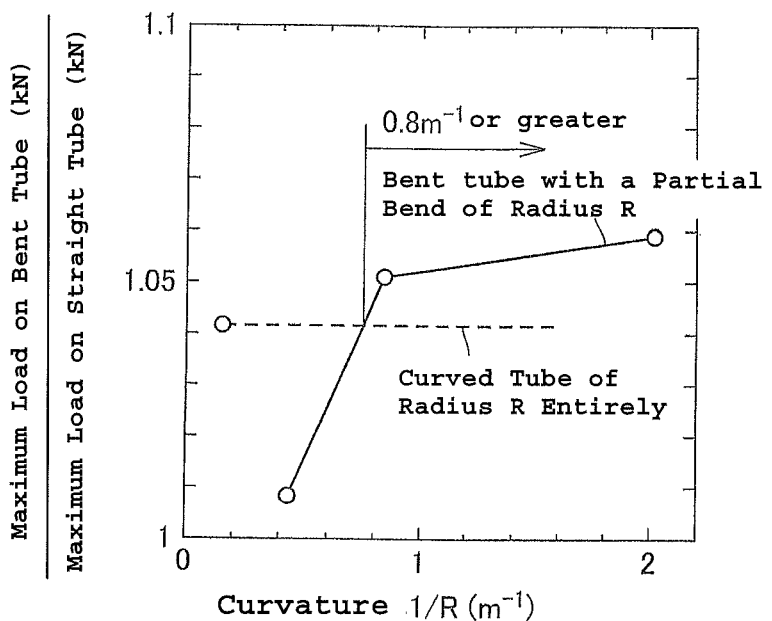
FIG. 5 is a figure that shows an effect of the curvature 1/R of the "bent tube with a partial bend of radius R", with reference to the characteristics of the "curved tube of radius R entirely (bending radius 6200 mm)"
Figure 5B:
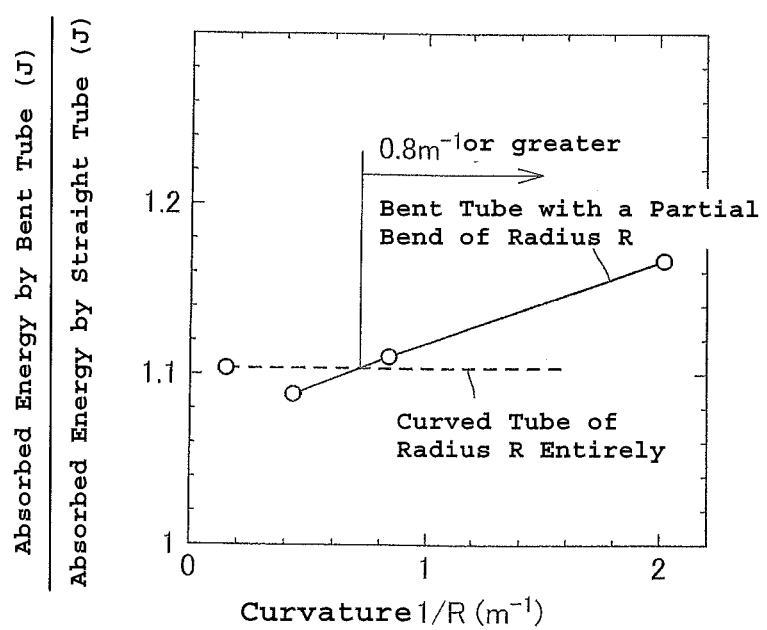

In the vehicle body reinforcing member according to the present invention, it is desirable for at least one outwardly projecting bent portion at a location that receives impact from outside the vehicle body to have a curvature of at least 0.8 m$^{-1}$. As shown in FIG. 5, when the curvature 1/R of an outwardly projecting bent portion that receives impact is small, there is little difference in the amount of absorbed energy between the bent tube and a straight tube. However, when the curvature 1/R of the outwardly projecting bent portion is greater, for example, if it is at least 0.8 m$^{-1}$, the amount of absorbed energy increases markedly.

The vehicle body reinforcing member according to the present invention is arranged such that the outwardly projecting bent portion is aligned in the outward direction of the vehicle body. However, the structure may be such that brackets are provided that are used to join the ends of the member to the vehicle body and the brackets are joined to the vehicle body. A so-called bracketless structure may also be used in which the brackets are not provided at both ends of the reinforcing member, and the end portions of the reinforcing member are joined directly to the vehicle body.

When the vehicle body reinforcing member according to the present invention is joined to the vehicle body, the member can be structured such that the ends of the member are straight portions. The member can also be structured such that the ends of the member are outwardly projecting bent portions having a different curvature from that of the aforementioned outwardly projecting bent portion. The member can also be structured such that the ends of the member are inwardly projecting bent portions having a different curvature from that of the aforementioned outwardly projecting bent portion.

[Cross Section Shape of Vehicle Body Reinforcing Member]

As described above, further weight reduction is being demanded for automobile parts and the like. In order to reduce weight, it is desirable for the wall thickness of the vehicle body reinforcing member to be as thin as possible. However, in order to ensure impact resistance, it is also important for the member to withstand flattening deformation in relation to bending displacement, so that the specified bending strength and energy absorption can be ensured and buckling strength during a collision can be obtained.

From this perspective, it is desirable for the cross section shape of a steel tube that is used as the vehicle body reinforcing member according to the present invention to be circular or oblong, or to be approximately circular or oblong.

FIGS. 12 and 13 are figures that show cross section shapes that can be used for a steel tube for use in the vehicle body reinforcing member according to the present invention. FIGS. 12A to D are figures that show examples of circular and oblong cross section shapes. The shapes are stable with respect to buckling in the circumferential direction and can be used without a sudden decrease in strength to withstand deformation up to the point where the deformation becomes ultimate.

Figure 12A:
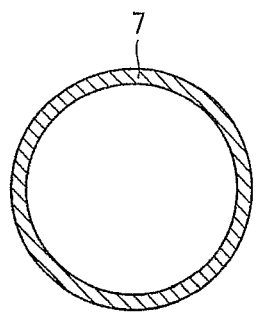
FIG. 12 is a figure that shows cross section shapes that can be used for a steel tube for use in a vehicle body reinforcement according to the present invention, showing an example of a circular or an oblong cross section shape.
Figure 12B:
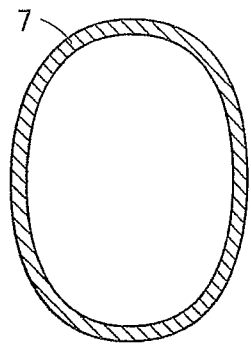
Figure 12C:
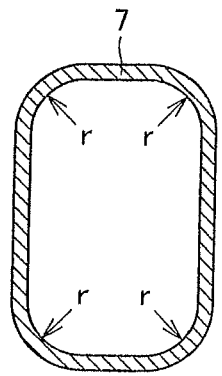
Figure 12D:
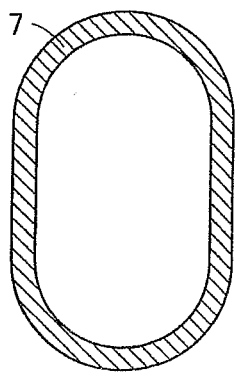

FIG. 12C shows a rectangular shape whose four corners have a radius of r. FIG. 12D shows an oval shape. Both shapes have two major sides that are straight line portions, which significantly increase their bending stiffness.

Figure 13A:
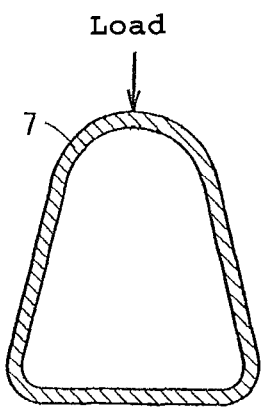
FIG. 13 is a figure that shows cross section shapes that can be used for the steel tube for use in a vehicle body reinforcement according to the present invention, showing examples of cross section shapes that are similar to a circle or an oblong.

FIGS. 13A and B are figures that show cross section shapes that are similar to circles and oblongs. A bell shape that is shown in FIG. 13A is a variation of a circular shape. The shape has a smaller radius at the top segment compared to a circle cross section against the downward loading, which increases its buckling resistance. The square-like segment at the bottom thereof increases the section modulus, which increases the maximum load that the shape can withstand.

Figure 13B:
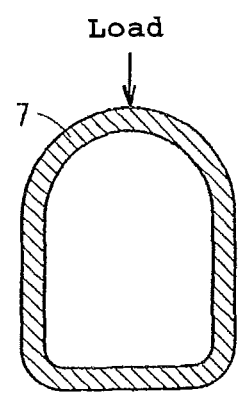

FIG. 13B shows a semi-cylindrical/hog-backed shape that has two major sides that are straight line segments, as well as another straight side as opposing to the semi-circle segment that receives the load. This shape increases the buckling resistance and greatly increases the bending stiffness.

Figure 13C:
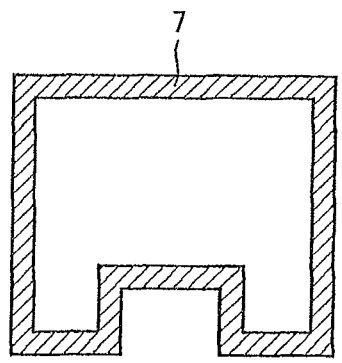

FIG. 13C shows an example of a complex closed cross section shape that is suitable in cases where the cross section shape is determined by the limited mounting space, as in a bumper beam and a center pillar reinforcement.

[Successive Incremental Heating, Successive Incremental Bending, and Successive Incremental Cooling of Steel Tube for a Vehicle Body Reinforcement]

Various types of bending methods can be used to form a bent tube for the steel tube for use in a vehicle body reinforcement according to the present invention. For example, press bending, tension bending, compression bending, roller bending, extrusion bending, eccentric plug bending, and the like can be used.

There are cases where a high-strength steel tube with a tensile strength exceeding 1000 MPa is used, but in these cases careful consideration to the bending method is important. Generally, the bending is done using a steel tube blank with a tensile strength of around 500 to 700 MPa as the starting material, after which the strength is increased by heat treatment to produce a high-strength steel tube.

However, given the recent demands to increase a vehicle body impact resistance, it is anticipated that even a bent tube will be required to have a quality level equivalent to that of a straight tube. Therefore, in a case where a high-strength steel tube is produced by heat treatment after the starting material is bent, it is difficult to prevent distortion if a method is used in which a straight pipe is directly electrically heated and then hardened over its entire length and circumference, as is proposed in Japanese Patent Application Publication No. 04 (1992)-280924.

If weight reduction of the steel tube is considered as well, it is desirable to select a material with a tensile strength of at least 1300 MPa, and it is even more desirable to select a material in the 1470 MPa class, in order to reliably ensure the strength of the material with respect to industrial technology. Accordingly, when a bent portion is formed in the steel tube for a vehicle body reinforcement according to the present invention, the specified high strength is ensured by using a high-frequency induction heating coil to heat a localized portion of the steel tube and then successively incrementally bending the heated portion, after which the bent portion is hardened by rapid cooling.

This method inhibits uneven hardening in several ways. Springback that is caused by residual stress is inhibited, because the bending is done while the tube is being in a heated state. A heavy loading is not required for the bending process, because the heating makes it easier to plastically deform the material. Moreover, excellent shape precision is obtained, because the rapid cooling after the bending fixes the shape. The cross section is heated and then uniformly cooled in successive steps. Because uneven hardening is thus inhibited, this method makes it possible to ensure stable quality, with almost no distortion caused by residual stress that is attributable to uneven hardening and with almost no variation in strength.

For example, in the case where a steel tube is bent, a localized portion of the tube blank that is the workpiece material is first heated by the high-frequency induction heating coil to a temperature that is at least the $A_3$ transformation point, but at which the microstructure of the material does not become coarse-grained. Tools are used to plastically deform the heated portion, then water or other liquid coolant, or gas, is immediately sprayed uniformly on the outer surface or the inner and outer surfaces of the tube blank to ensure a cooling rate of at least 100° C./second.

Because the steel tube thus bent is cooled uniformly, good shape fixability and uniform hardness can be obtained, excessive residual stress can be inhibited, and excellent delayed-fracture resistance can be provided, in spite of the high strength. A steel tube with even greater strength, more uniform hardness distribution, and better delayed-fracture resistance can be produced by incorporating, in the material design, chemical elements that facilitate hardening, like titanium (Ti) and boron (B), for example.

The bending process according to the present invention not only makes it possible to produce a high-strength steel tube by heating a low-strength steel tube blank as the starting material, then increasing its strength by hardening it. It also makes it possible to produce a steel tube with even better impact resistance by reheating and bending an already hardened, high-strength steel tube blank, then hardening it for a second time to give it a finer-grained structure.

Therefore, the demand for greater vehicle body impact resistance can be satisfied by using the successive incremental heating, successive incremental bending, and successive incremental cooling according to the present invention, even in the case where the bent portion is to be formed in the steel tube for use in a vehicle body reinforcement.

FIG. 14 is an explanatory figure that shows a schematic structure of a high-frequency induction heating and bending unit that is used to form a bent portion in the steel tube for use in a vehicle body reinforcement according to the present invention. FIG. 14 also shows, as an example, a procedure for processing the "bent tube with mixed bends of inward and outward projection". FIG. 14A shows a state in which the steel tube is set in the unit. FIG. 14B shows a state in which an end portion of the steel tube is hardened as being a straight portion, without being bent. FIG. 14C shows a state in which a first outwardly projecting bent portion is processed. FIG. 14D shows a state in which a first inwardly projecting bent portion is processed. FIG. 14E shows a state in which a second outwardly projecting bent portion to be in a middle length portion is processed. FIG. 14F shows a state in which a second inwardly projecting bent portion is processed. FIG. 14G shows a state in which a third outwardly projecting bent portion is processed.

The structure of the unit is such that, starting from an entrance side, guide rollers 14, 15 are arranged that successively guide and move the steel tube 7, and a ring-shaped induction heating coil 11 is arranged on an exit side. Close to the exit side of the induction heating coil 11 is arranged a cooling unit 12 that sprays a cooling water to harden and to rigorously form and fix the shape of the steel tube 7 after it is heated. The narrower the ring-shaped heated width of the steel tube 7 is, the less the flattening incurred by bending operation occurs, so the induction heating coil 11 and the cooling unit 12 are preferably disposed to be as close as possible to one another, and it is even more desirable for the induction heating coil 11 and the cooling unit 12 to be built as an integrated one-piece structure.

In addition, a pair of offset rollers 13 is arranged on the exit side of the induction heating coil 11 and the cooling unit 12. The offset rollers 13 force to perform bending on the ring-shaped heated portion of the steel tube 7 by making contact with the steel tube 7 such that a bending moment is imparted to the steel tube 7.

Based on FIGS. 14A to G, a procedure will be explained by which the "bent tube with mixed bends of inward and outward projection" is processed. The "bent tube with mixed bends of inward and outward projection" has straight portions at both ends and has three outwardly projecting bent portions and two inwardly projecting bent portions.

Figure 14A:
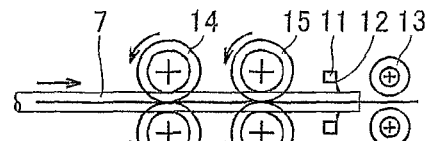
FIG. 14 is an explanatory figure that shows a schematic structure of a high-frequency induction heating and bending unit that is used to form bent portions in the steel tube for use in a vehicle body reinforcement according to the present invention, also showing, as an example, a procedure for processing the "bent tube with mixed bends of inward and outward projection"
Figure 14B:
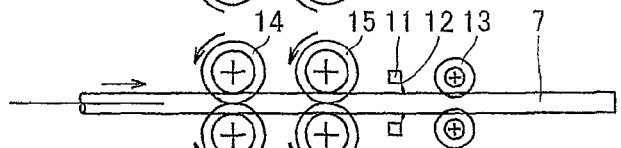

As shown in FIG. 14A, after the steel tube 7 is set in the high-frequency induction heating and bending unit, it is driven by the guide rollers 14, 15 toward the offset rollers 13. As shown in FIG. 14B, only the heat treatment is performed on the end portions of the steel tube 7, and the bending is not performed, so the offset rollers 13 do not make contact with the end portions, and the heat treatment is performed in as-straight condition.

Figure 14C:
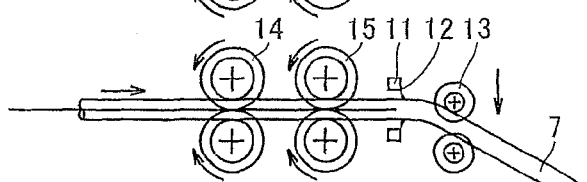

Next, as shown in FIG. 14C, as the guide rollers 14, 15 advance the steel tube 7, the offset rollers 13 shift in the direction indicated by the arrow, making contact with the steel tube 7, imparting a bending moment to the steel tube 7, and performing the bending on the ring-shaped heated portion. After the bending deformation, the ring-shaped heated portion is immediately rapidly cooled and hardened by the cooling unit 12 on the exit side of the induction heating coil 11.

At this time, the strength of the steel tube 7 after hardening is high, so the plastic deformation by the bending moment imparted by the offset rollers 13 occurs only in the ring-shaped heated portion, where the steel strength is lowered. Excellent shape fixability can thus be obtained. Therefore, the desired bending process can be performed by controlling the feeding of the steel tube 7 in the axial direction and the shifting of the offset rollers 13.

Figure 14D:
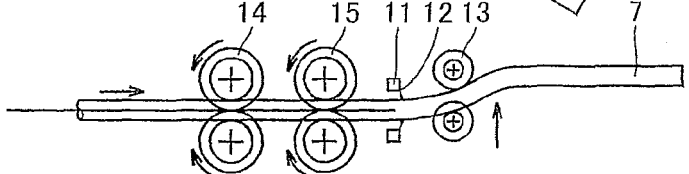
Figure 14E:
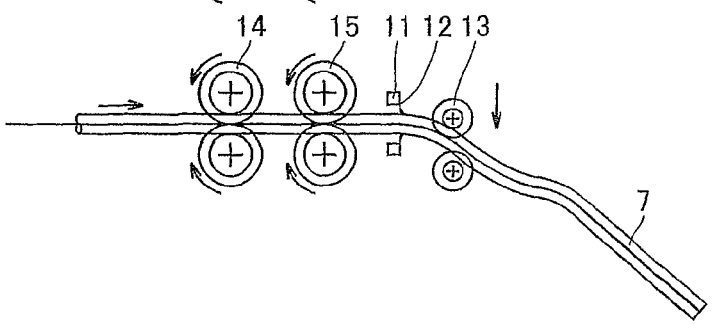
Figure 14F:
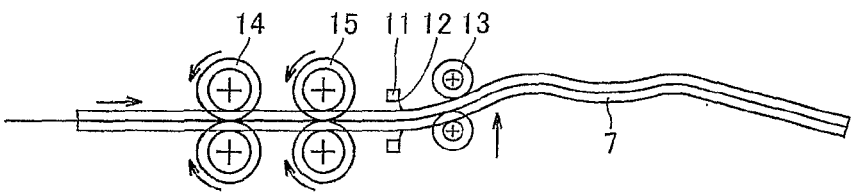
Figure 14G:
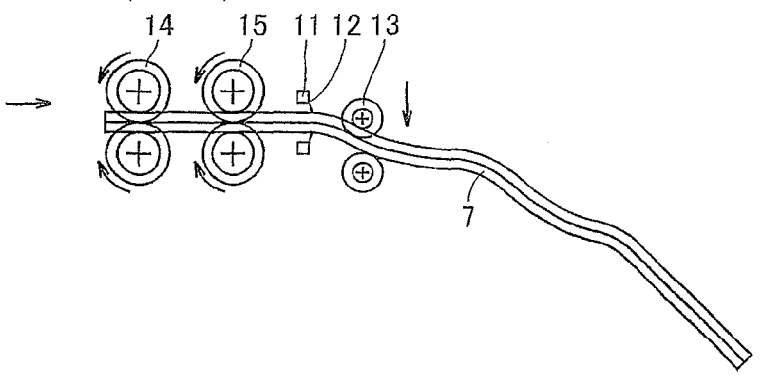

As shown in FIG. 14D, after the first outwardly projecting bent portion is processed, the first inwardly projecting bent portion is processed by shifting the offset rollers 13 in the opposite direction, as shown by the arrow, while the steel tube 7 is moved in the axial direction. Thereafter, as shown in FIGS. 14E, 14F, and 14G, as the steel tube 7 is moved continuously in the axial direction, the offset rollers 13 are positioned, while making contact with the steel tube 7, according to the bending directions and geometries of the bent portions. The offset rollers 13 can form the desired bent portions by imparting the bending moment to the ring-shaped heated portions of the steel tube, thus performing the bending process.

A method such as this can ensure excellent shape fixability and stable quality for a steel tube in which a bent portion is formed, so it can also provide the required level of vehicle body impact resistance. Moreover, even in the case where the bending process is performed using a low-strength steel tube blank as the starting material, the strength can be increased by uniform hardening, and a steel tube can be produced that is equivalent to a steel tube with a tensile strength of at least 1300 MPa and even equivalent to a 1470 MPa class steel tube.

Figure 1:
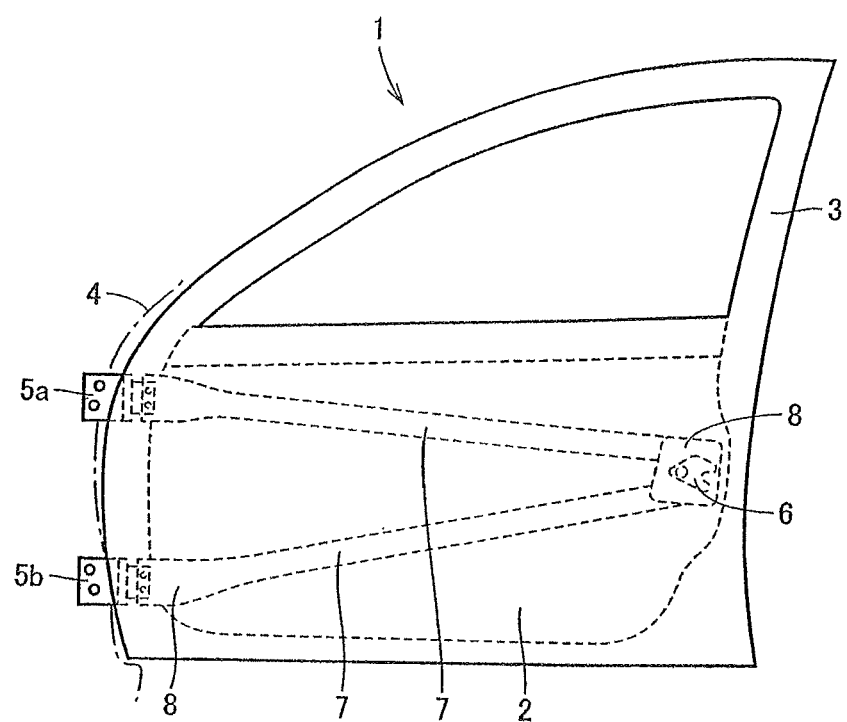
FIG. 1 is a figure that shows a vehicle body structure that uses reinforcing members in an automobile door as door impact bars.
Figure 2A:
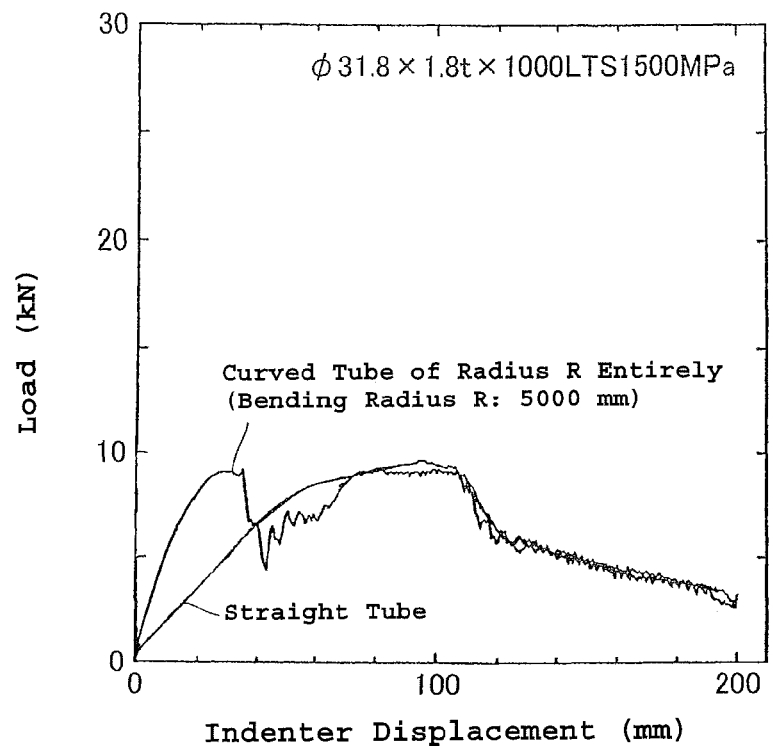
FIG. 2 is a figure that shows results of three-point bending tests when a straight tube and a tube that is bent over its entire length are used as impact bar test pieces.
Figure 2B:
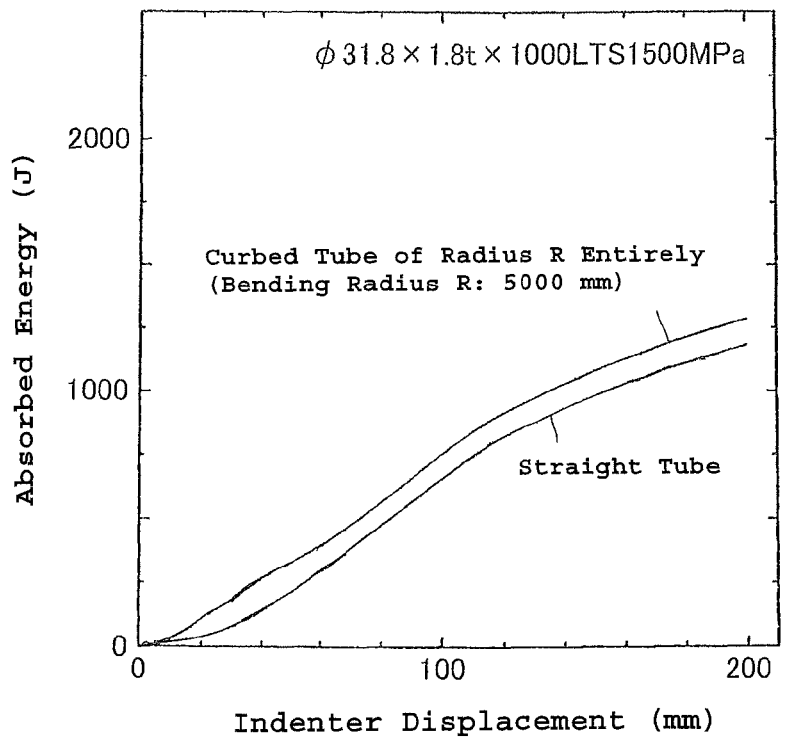
Figure 3A:
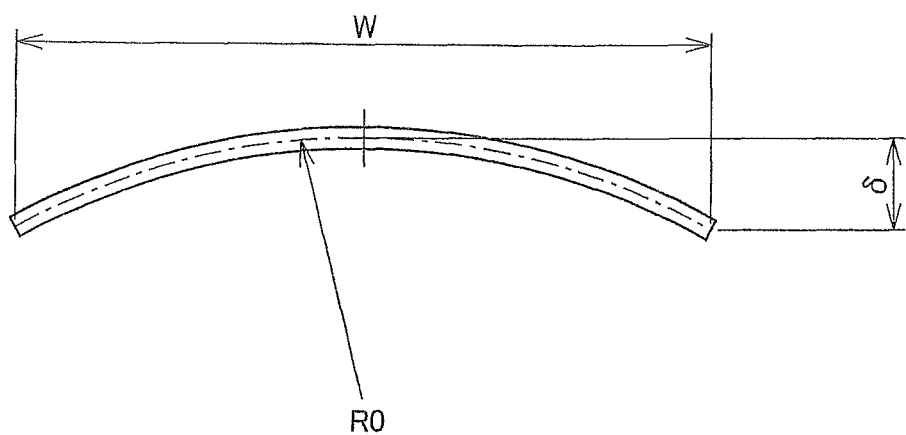
FIG. 3 is an explanatory figure of overall shapes of a "curved tube of radius R entirely" and a "bent tube with a partial bend of radius R", which tubes are used as vehicle body reinforcing members.
Figure 3B:
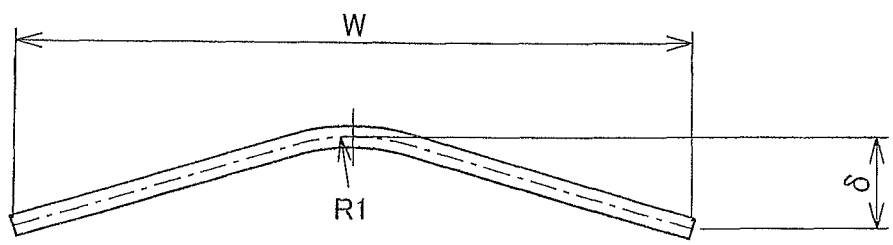
Figure 4A:
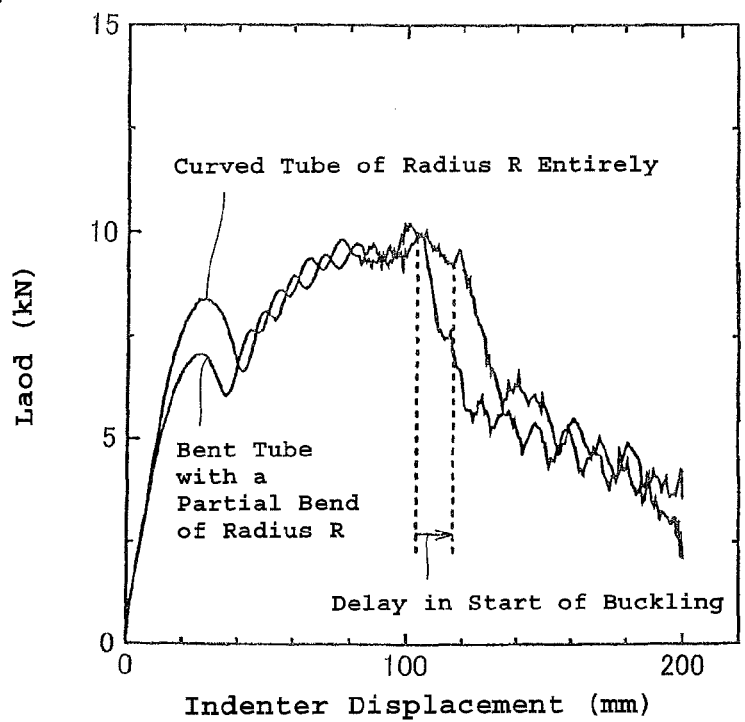
FIG. 4 is a figure that shows results of three-point bending tests when the "curved tube of radius R entirely" and the "bent tube with a partial bend of radius R" are used as test pieces.
Figure 4B:
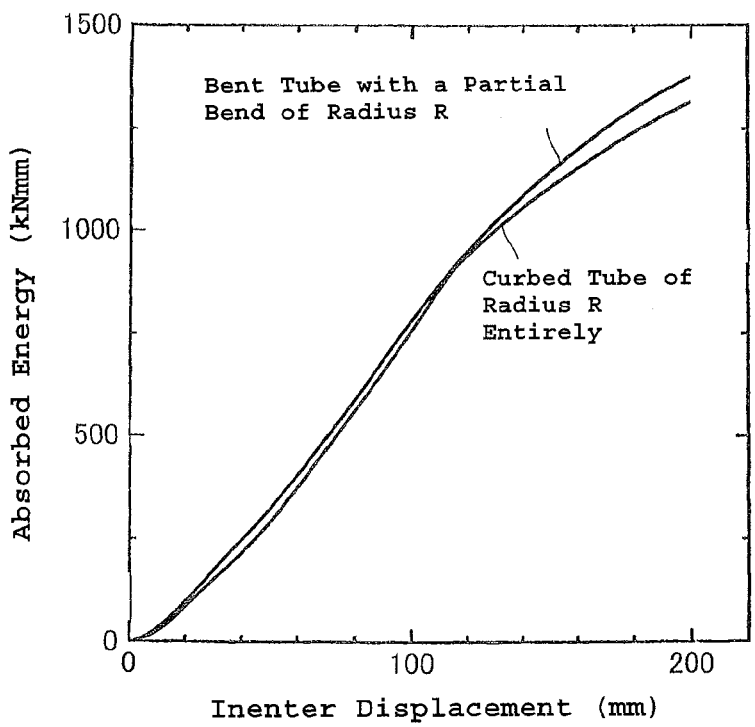
Figure 15A:
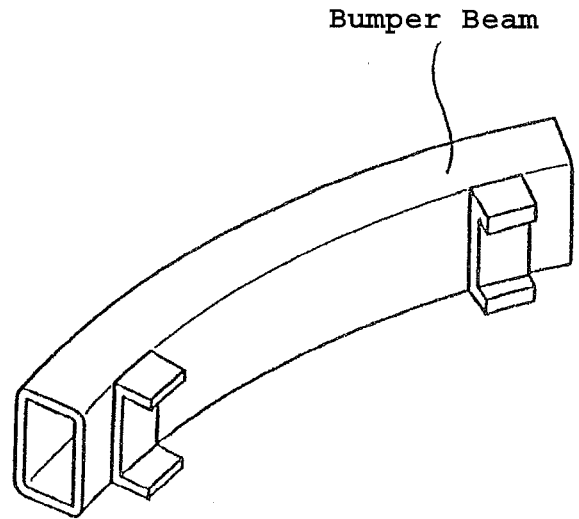
FIG. 15 is a figure that shows structures of a bumper beam and a cross member in which the vehicle body reinforcing member according to the present invention is used to protect occupants during a collision.
Figure 15B:
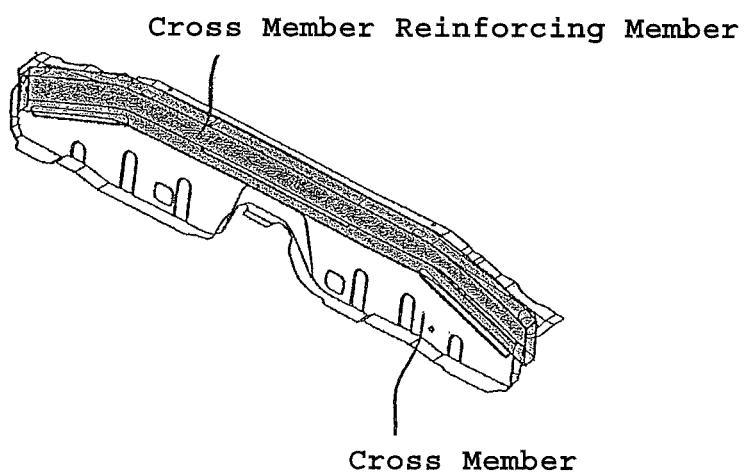
Figure 16A:
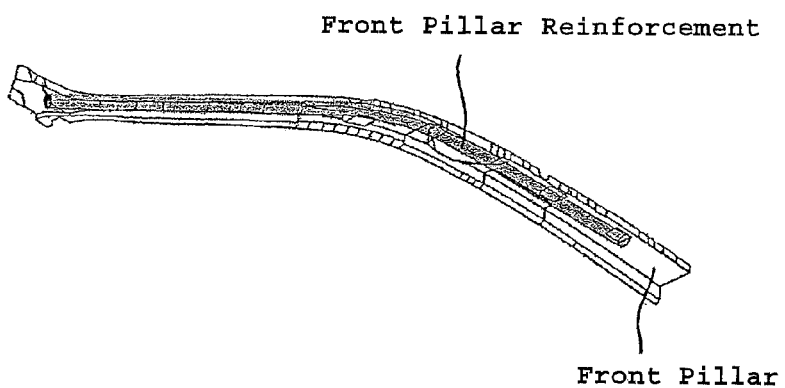
FIG. 16 is a figure that shows structures of a front pillar reinforcement and a center front pillar reinforcement in which the vehicle body reinforcing member according to the present invention is used to protect occupants during a collision.
Figure 16B:
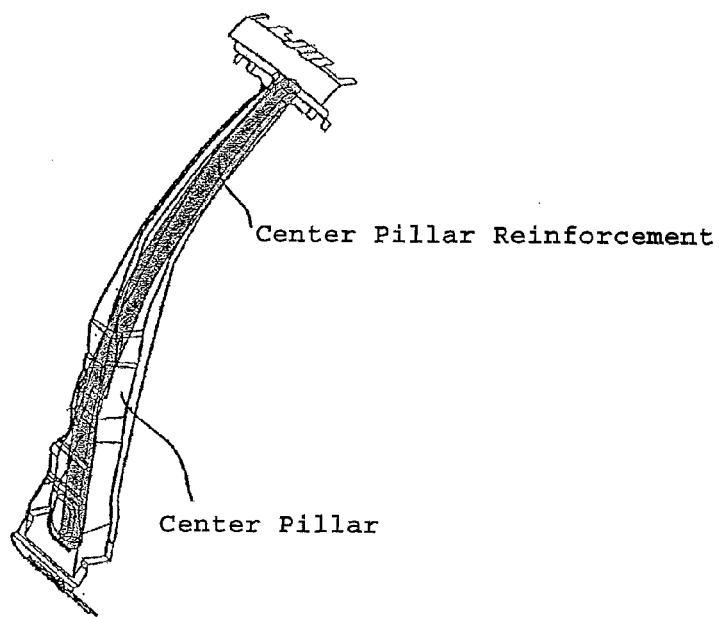

The vehicle body reinforcing member according to the present invention can be assured to have high strength, excellent shape fixability, and stable quality. It can therefore be used as a bumper beam (FIG. 15A), a cross member reinforcing member (FIG. 15B), a front pillar reinforcement (FIG. 16A), a center pillar reinforcement (FIG. 16B), a side sill, and the like other than the door impact bars shown in FIG. 1 mentioned above.

EXAMPLES

Example 1

In order to confirm the effects of reducing the wall thickness (reducing weight) in the case where a steel tube is used as the vehicle body reinforcing member according to the present invention, a 1470 MPa class steel tube test piece was manufactured. The test piece was a "bent tube with multiple bends of inward and outward projection", having outwardly projecting bent portions with a bending radius R (curvature 1/R) at three locations and inwardly projecting bent portions adjacent to each outwardly projecting bent portion, as shown in FIG. 6. The test piece was made using as the starting material a low-strength tube blank (YP:450 MPa, TS:555 MPa, EL:23%) with a typical chemical composition comprising: 0.22% carbon, 1.20% manganese, 0.20% chromium, 0.02% titanium, and 0.0015% boron. The portions of the tube to be bent were successively incrementally heated by high-frequency induction heating to 950° C., then, after being successively incrementally bent in hot condition, were successively incrementally subjected to a rapid cooling by water at a cooling rate of 300° C./second.

The manufactured steel tube test piece had the shape and dimensions shown in Table 1. The tensile strength exceeded 1500 MPa, and the microstructure was martensite and bainite.

A "curved tube of radius R" and having a tensile strength exceeding 1500 MPa and the geometry and dimensions shown in Table 1 was prepared as a Comparative Example 1. A straight tube having a tensile strength exceeding 1500 MPa and the outside diameter, wall thickness, and length dimensions shown in Table 1 was prepared as a Comparative Example 2. Bending tests were performed on the Comparative Examples 1 and 2, as well as on the Inventive Examples, using a three-point bending test machine, with both ends of each test piece supported constrainedly spanning 1000 mm. The amounts of absorbed energy were measured. The ratios of the amount of absorbed energy with respect to the straight tube (Comparative Example 2) are shown in Table 1.

TABLE 1

| | | Steel tube test piece conditions | | | | | | Ratios relative to straight tube | |
|---|---|---|---|---|---|---|---|---|---|
| | | | | | | Bending | | | |
| Test No. | Classification | Outside diameter mm | Wall thickness mm | Length W mm | Projection amount $\delta$ mm | radius R1/R2 mm | Outwardly bent portions | Ramp load (kN)/(kN) | Absorbed Energy (J)/(J) |
| 1 | Inventive Example | 31.8 | 1.6 | 1000 | 20 | 500/1000 | 3 | 1.21 | 1.17 |
| 2 | Comparative Example 1 | 31.8 | 1.6 | 1000 | 20 | 6200 | — | 1.10 | 1.13 |

TABLE 1-continued

| Test No. | Classification | Steel tube test piece conditions | | | | | | Ratios relative to straight tube | |
|---|---|---|---|---|---|---|---|---|---|
| | | Outside diameter mm | Wall thickness mm | Length W mm | Bending Projection amount δ mm | radius R1/R2 mm | Outwardly bent portions | Ramp load (kN)/(kN) | Absorbed Energy (J)/(J) |
| 3 | Comparative Example 2 | 31.8 | 1.8 | 1000 | 0 | — | — | 1.00 | 1.00 |

Note:
Inventive Example is a bent tube with multiple bends of inward and outward projection. Comparative Example 1 is a curved tube of radius R entirely. Comparative Example 2 is a straight tube.

It can be understood from the results in Table 1 that using the Inventive Example, the "bent tube with multiple bends of inward and outward projection", makes it possible to absorb more energy and to ensure better impact resistance than with the straight tube and the "curved tube of radius R entirely", despite its thin wall.

Example 2

A detailed examination was conducted of the characteristics, that is, the tensile strength, the microstructure, the hardness distribution, the shape fixability, the flattening property, the residual stress, and the delayed-fracture resistance, of a bent steel tube that is used as the vehicle body reinforcing member according to the present invention. Tube blanks with differing strength levels were prepared as the starting materials. The tube blanks each had an outside diameter of 31.8 mm, a wall thickness of 2.3 mm, and a chemical composition comprising 0.22% carbon, 1.20% manganese, 0.20% chromium, 0.02% titanium, and 0.0015% boron. Steel tube test pieces were made by applying the bending process on the prepared tube blanks, and the characteristics were examined. The strength levels of the tube blanks, the bending process conditions, and the strength levels and the microstructure of the steel tube test pieces are shown in Table 2.

TABLE 2

| Test No. | Classification | Tube blank strength requirements | | | Bending process conditions | Steel tube test piece strength requirements (after bending process) | | | |
|---|---|---|---|---|---|---|---|---|---|
| | | YP MPa | TS MPa | EL % | (Heating - Bending - Cooling) | YP MPa | TS MPa | EL % | Microstructure |
| 4 | Inventive Example | 450 | 555 | 23 | Successive incremental heating and bending - Rapid cooling | 1215 | 1639 | 13 | M + B |
| 5 | Inventive Example | 1205 | 1625 | 12 | Successive incremental heating and bending - Rapid cooling | 1203 | 1633 | 12 | M + B |
| 6 | Comparative Example 3 | 450 | 555 | 23 | Successive incremental heating and bending - Slow cooling | 358 | 462 | 42 | F + P |
| 7 | Comparative Example 4 | 450 | 555 | 23 | Cold bending | 485 | 593 | 20 | F + P |
| 8 | Comparative Example 5 | 1205 | 1625 | 12 | Cold bending | 1205 | 1644 | 11 | M + B |
| 9 | Comparative Example 6 | 450 | 555 | 23 | Entire length heating and bending - Rapid cooling | 1240 | 1686 | 12 | M + B |
| 10 | Comparative Example 7 | 450 | 555 | 23 | Entire length heating and bending - Slow cooling | 345 | 455 | 43 | F + P |
| 11 | Comparative Example 8 | 1205 | 1625 | 12 | Entire length heating and bending - Rapid cooling | 1235 | 1677 | 13 | M + B |

Note:
In the microstructure column, M is martensite, B is bainite, F is ferrite, and P is pearlite.

(1) Bending Process Conditions, Steel Tube Test Piece Strength Levels, and the Like As shown in Table 2, three types of bending process conditions were used: successive incremental bending by successive incremental heating, cold bending, and bending the entire length by heating the entire length. The steel tube test pieces that were "bent tubes with multiple bends of inward and outward projection" having outwardly projecting bent portions at three locations, as shown in FIG. 6. The target processed shape for the steel tube test pieces was an overall length W of 1000 mm and a projection distance 6 of 20 mm. Detailed bending process conditions are shown in Table 3.

tube 7 from cooling nozzles 19 that are provided on the opposite side to the bending jig 16. In the case of slow cooling, natural cooling, i.e. cooling in air, is applied.

After the bending processes, test specimens were taken from the straight portions of the steel tube test pieces. Tensile tests were conducted, and the microstructures of the specimens were observed by means of a microscope. The results are shown in Table 2. The tensile tests were conducted by the method prescribed in JIS Z 2241 using JIS Z 2201 No. 11 type test specimens. For the microstructural observations by microscope, natal etched circumferential cross sections of the tubes were observed at a magnification of 500.

TABLE 3

| Test No. | Classification | Workpiece feed rate mm/sec | Heating coil frequency kHz | Heating temperature °C. | Cooling conditions | | |
|---|---|---|---|---|---|---|---|
| | | | | | Classification | Cooling procedure | Coolant temperature °C. |
| 4 | Inventive Example | 15 | 10 | 980 | Water cooling | 100 L/min | 20 |
| 5 | Inventive Example | 15 | 10 | 980 | Water cooling | 100 L/min | 20 |
| 6 | Comparative Example 3 | 15 | 10 | 980 | Slow cooling | Natural cooling | |
| 7 | Comparative Example 4 | — | — | As-cold | — | — | — |
| 8 | Comparative Example 5 | — | — | As-cold | — | — | — |
| 9 | Comparative Example 6 | — | — | 980 | Water cooling | 100 L/min | 20 |
| 10 | Comparative Example 7 | — | — | 980 | Slow cooling | Natural cooling | |
| 11 | Comparative Example 8 | — | — | 980 | Water cooling | 100 L/min | 20 |

First, for Inventive Examples and Comparative Example 3, successive incremental bending by successive incremental heating was used. The tube blank feed rate was 15 mm/second, and successive incremental bending was performed with the tube blank heated to 980° C. by high-frequency induction heating. The subsequent cooling processes were classified into rapid cooling by water cooling to a cooled temperature of 20° C. and slow cooling by natural cooling, i.e. cooled in air.

Figure 17:
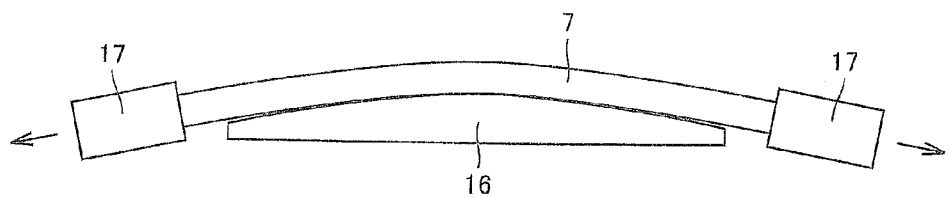
FIG. 17 is an explanatory figure that shows a method that is used in Example 2 for cold bending.

FIG. 17 is an explanatory figure that shows a method that is used in Example 2 for cold bending. For the Comparative Examples 4 and 5, tension bending in the axial direction was performed as shown in FIG. 17, wherein with the tube blanks being at room temperature, both ends of the tube were held by chucks 17, and the tubes were pressed by a bending jig 16.

Figure 18:
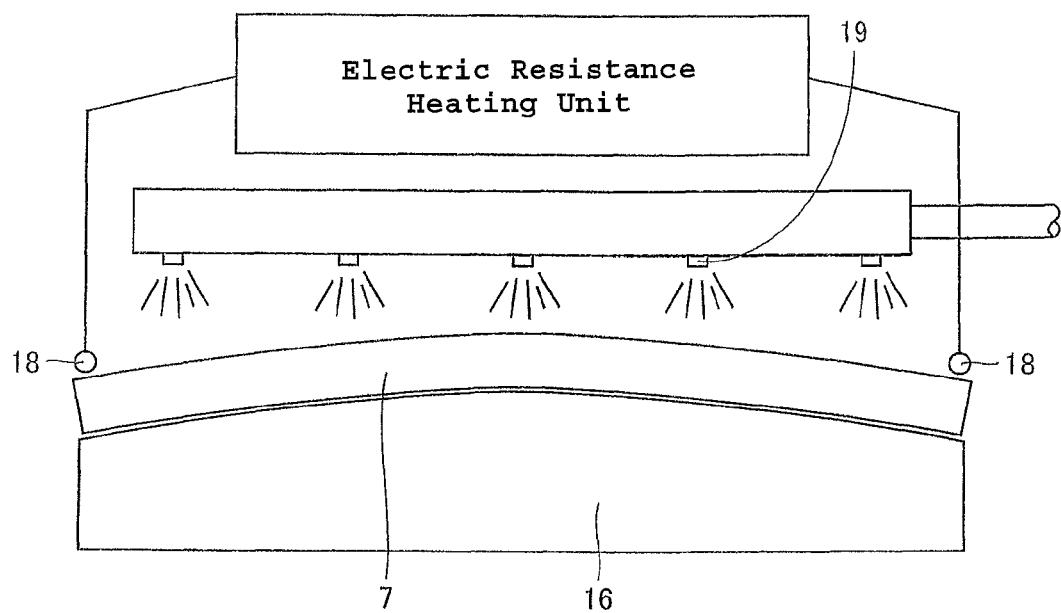
FIG. 18 is an explanatory figure that shows a method that is used in Example 2 for bending an entire length of a tube by heating the entire length of the tube.

FIG. 18 is an explanatory figure that shows a method that is used in Example 2 for bending the entire length of a tube by heating the entire length of the tube. For the Comparative Examples 6 to 8, connection terminals 18 that apply electric current directly are brought into contact with both ends of the tube blank, as shown in FIG. 18, to heat the tube blank over its entire length. Next, the entire length of the tube blank is press-bent by the bending jig 16. Next, in the cases of rapid cooling, water is sprayed onto the outer surface of the steel According to the results shown in Table 2, the present invention produced a microstructure having martensite and bainite as its main constituents, and strength in the 1470 MPa class could be ensured. However, the Comparative Example 3, because it was cooled slowly by natural cooling after successive incremental bending by successive incremental heating, produced a microstructure having ferrite and pearlite mainly, so it was not possible to surpass the strength level of the tube blank.

Figure 19:
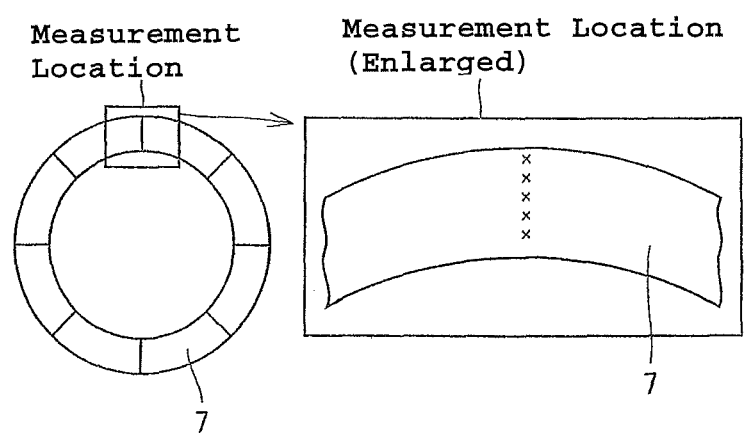
FIG. 19 is an explanatory figure that shows measurement positions for a Vickers hardness test.

(2) Measurement of Hardness Distribution, Shape Fixability, Flattening Property, and Residual Stress in Steel Tube Test Pieces Table 4 shows Vickers hardness test (JIS Z 2244) measurement results for the hardness distribution of the bent portions of the tubes. The test load during the measurement was 1 kg. As shown in FIG. 19, the measurements were made at eight locations at 45-degree intervals around the circumference of the tube. Measurements were made at five positions at each location, for a total of forty measurement positions per steel tube test piece. The hardness uniformity was judged to be acceptable if the difference in any Vickers hardness measurement was less than 100.

TABLE 4

| Test No. | Classification | Maximum hardness Hv (max) | Minimum hardness Hv (min) | Hardness difference Hv (max − min) | Hardness uniformity assessment |
|---|---|---|---|---|---|
| 4 | Inventive Example | 517 | 491 | 26 | ○ |
| 5 | Inventive Example | 511 | 490 | 21 | ○ |
| 6 | Comparative Example 3 | 155 | 145 | 10 | ○ |
| 7 | Comparative Example 4 | 480 | 188 | 292 | x |
| 8 | Comparative Example 5 | 525 | 320 | 205 | x |
| 9 | Comparative Example 6 | 505 | 438 | 67 | x |
| 10 | Comparative Example 7 | 149 | 138 | 11 | ○ |
| 11 | Comparative Example 8 | 518 | 420 | 98 | x |

Table 5 shows measurement results for the shape fixability of the bent portions of the tubes. The steel tube test pieces were manufactured to the target processed shape shown in FIG. 6. The projection distance σ was measured at the mid-length position of each tube, and the difference between the maximum projection and the minimum projection was also measured. The shape fixability was judged to be acceptable if the difference was not greater than 1.5 mm.

TABLE 5

| Test No. | Classification | Maximum projection Hmax (mm) | Minimum projection Hmin (mm) | Projection difference Hmax − Hmin (mm) | Shape fixability assessment |
|---|---|---|---|---|---|
| 4 | Inventive Example | 21.0 | 19.7 | 1.3 | ○ |
| 5 | Inventive Example | 20.8 | 19.5 | 1.3 | ○ |
| 6 | Comparative Example 3 | 22.4 | 18.1 | 4.3 | x |
| 7 | Comparative Example 4 | 22.8 | 18.5 | 4.3 | x |
| 8 | Comparative Example 5 | 19.8 | 15.3 | 4.5 | x |
| 9 | Comparative Example 6 | 22.2 | 17.8 | 4.4 | x |
| 10 | Comparative Example 7 | 23.0 | 18.4 | 4.6 | x |
| 11 | Comparative Example 8 | 22.8 | 18.1 | 4.7 | x |

Table 6 shows measurement results for the flattening property of the bent portions of the tubes. For each steel tube test piece, the outside diameter of the bent portion was measured at four locations around the circumference thereof, and the ratio of the minimum diameter to the maximum diameter was evaluated in comparison. The flattening property was judged to be acceptable if the ratio was 99.0% or greater.

TABLE 6

| Test No. | Classification | Flattening property measurement results Minimum outside diameter/ Maximum outside diameter (Dmin/Dmax %) | Flattening property assessment |
|---|---|---|---|
| 4 | Inventive Example | 99.3~99.6 | ○ |
| 5 | Inventive Example | 99.2~99.7 | ○ |
| 6 | Comparative Example 3 | 93.2~95.3 | x |
| 7 | Comparative Example 4 | 90.0~94.0 | x |
| 8 | Comparative Example 5 | 85.0~90.0 | x |
| 9 | Comparative Example 6 | 91.0~94.0 | x |
| 10 | Comparative Example 7 | 92.0~95.0 | x |
| 11 | Comparative Example 8 | 91.5~95.5 | x |

Figure 20:
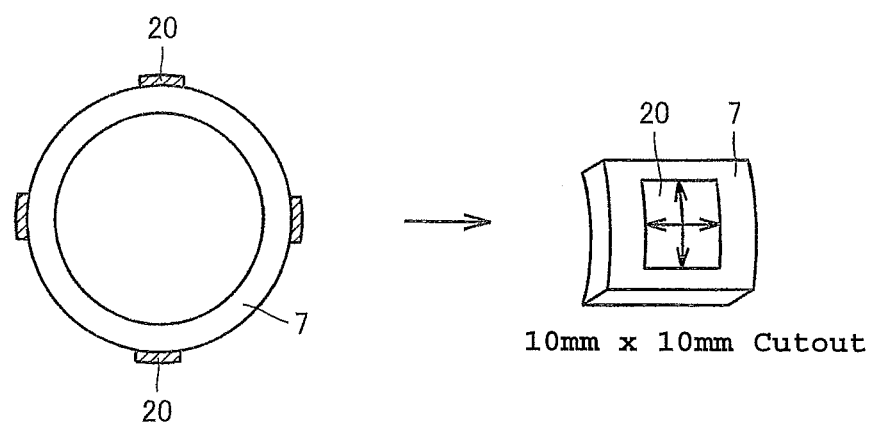
FIG. 20 is an explanatory figure that shows a procedure that is used in Example 2 for measuring residual stress.

FIG. 20 is an explanatory figure that shows a procedure that is used in Example 2 for measuring residual stress. A strain gauge 20 was attached at four locations at 90-degree intervals around the circumference of the steel tube test piece 7. Square sections measuring 10 mm×10 mm were then cut out from areas where the strain gauge 20 had been attached, and the residual stress was measured by measuring the difference in strains before and after cutting. Table 7 shows the maximum residual stress values for the bent portions.

TABLE 7

| Test No. | Classification | Residual stress measurement results Maximum residual stress (strain gauge) (MPa) |
|---|---|---|
| 4 | Inventive Example | −90 |
| 5 | Inventive Example | −78 |
| 6 | Comparative Example 3 | −27 |
| 7 | Comparative Example 4 | +251 |
| 8 | Comparative Example 5 | +790 |

TABLE 7-continued

| Test No. | Classification | Residual stress measurement results Maximum residual stress (strain gauge) (MPa) |
|---|---|---|
| 9 | Comparative Example 6 | +342 |
| 10 | Comparative Example 7 | +110 |
| 11 | Comparative Example 8 | +419 |

(3) Evaluation of Delayed-Fracture Resistance

Figure 21:
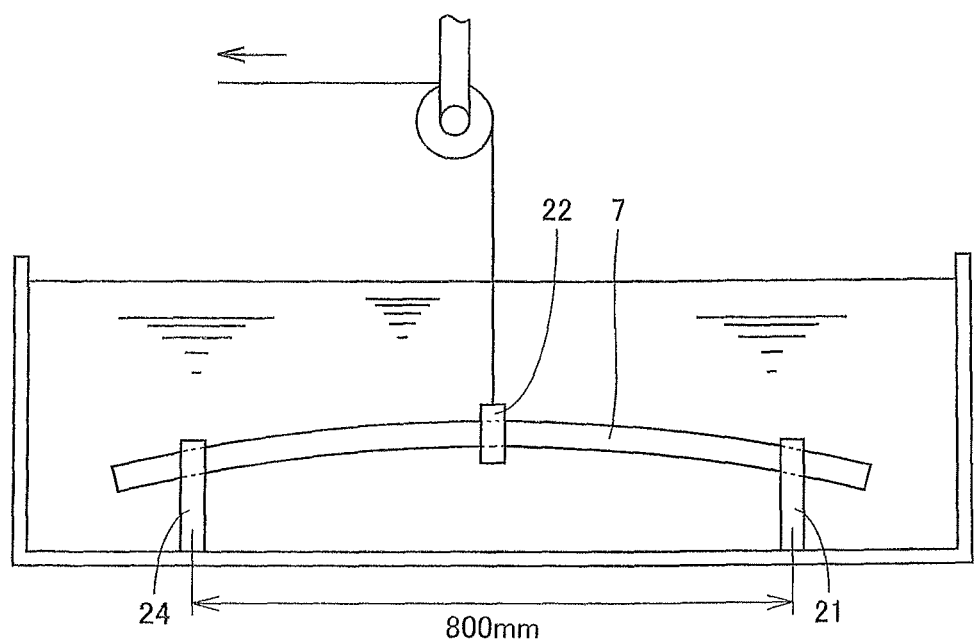
FIG. 21 is an explanatory figure that shows a structure of a delayed-fracture test unit that is used in Example 2.

FIG. 21 is an explanatory figure that shows a structure of a delayed-fracture test unit that is used in Example 2. The steel tube test piece 7 was soaked in artificial seawater containing 0.5% acetic acid, and both ends of 800 mm in span were held by fixed jigs 21. A tension jig 22 that was provided in the mid-length portion was used to hold the tube in a state of 400 MPa bending load stress for 1000 hours, and then, the steel tube test piece 7 was visually inspected for the presence or absence of cracks.

Table 8 shows the evaluation results for delayed-fracture resistance. The tube was judged to be acceptable if cracks could not be confirmed visually after the delayed-fracture test.

TABLE 8

| Test No. | Classification | Delayed-fracture test conditions | | | | Delayed-fracture resistance assessment |
|---|---|---|---|---|---|---|
| | | Bending load span | Bending load stress | Soak solution | Soak time | |
| 4 | Inventive Example | 800 mm | 400 MPa (Plumb bob weight: 300 kg) | 0.5% Acetic acid + Artificial seawater | 1000 Hr | ○ |
| 5 | Inventive Example | | | | | ○ |
| 6 | Comparative Example 3 | | | | | ○ |
| 7 | Comparative Example 4 | | | | | ○ |
| 8 | Comparative Example 5 | | | | | x |
| 9 | Comparative Example 6 | | | | | x |
| 10 | Comparative Example 7 | | | | | ○ |
| 11 | Comparative Example 8 | | | | | x |

(4) Overall Evaluation

By using rapid cooling after successive incremental bending by successive incremental heating according to the present invention, it was possible to produce a strength level that amply satisfied 1470 MPa class tensile strength requirements, even when a low-strength tube blank was used as the starting material. Furthermore, in addition to excellent shape fixability, the present invention provides good hardness uniformity and flattening property over the entire length and entire cross section of the tube. The test results indicate that delayed failure resistance was markedly improved, because the residual stress could be reduced.

In contrast, the Comparative Example 3, for which successive incremental bending by successive incremental heating was used, was judged to have good hardness uniformity, shape fixability, and delayed-fracture resistance, but because the cooling method was slow cooling, an adequate strength level could not be achieved.

For the Comparative Example 4, a low-strength tube blank was processed by cold bending, so only a slight increase in strength due to work hardening was confirmed. Moreover, springback occurred due to the cold working, and both the shape fixability and the flattening property were poor.

For the Comparative Example 5, a high-strength tube blank was processed by cold bending, so high strength could be ensured despite the slight work hardening, but the shape fixability was poor. The delayed-fracture resistance was also poor due to the presence of great residual stress.

The Comparative Examples 6 to 8 were heated over their entire lengths and bent over their entire lengths, so large variations occurred in the bent shapes and the shape fixability was poor. The Comparative Examples 6 and 8 achieved high strength, but because the cooling method was to cool the entire tube blanks in one step, the hardening was uneven, and the hardness uniformity was poor. In addition, the uneven hardness led to large residual stress, so the delayed-fracture resistance was poor. The Comparative Example 7 did not achieve sufficient strength, because it was cooled by slow cooling.

INDUSTRIAL APPLICABILITY

Using the "bent tube with mixed bends of inward and outward projection" according to the present invention as a vehicle body reinforcing member for automotive use makes it possible to absorb more energy during a vehicle body collision than with a reinforcing member that uses the known straight tube or the "curved tube of radius R entirely". It is also possible to demonstrate better impact resistance as a vehicle body reinforcing member. Thus the dimensions (outside diameter, wall thickness) of the steel tube that is used as the vehicle body reinforcing member can be reduced while impact resistance is maintained. Optimizing the shape in this manner makes it possible to provide the ever higher required level of vehicle body impact resistance at the same time that it reduces the weight of the vehicle body and lowers the cost. The present invention can therefore be widely used as an occupant protection technology.

What is claimed is:

1. A vehicle body reinforcing member made of a steel tube that is attached to an automobile body for impact resistance, the vehicle body reinforcing member comprising:
  a plurality of outwardly projecting bent portions, the outwardly projecting bent portions at a plurality of locations in a length-wise direction of the vehicle body reinforcing member, the outwardly projecting bent portions being towards an outer surface of the vehicle body; and inwardly projecting bent portions on one or each side adjacent to said each outwardly bent portion.

2. The vehicle body reinforcing member according to claim 1, wherein a primary curvature of the outwardly projecting bent portion at least at one location that receives impact from outside the vehicle body is at least $0.8 \text{ m}^{-1}$.

3. The vehicle body reinforcing member according to claim 1, wherein an end portion of the vehicle body reinforcing member is one of a straight portion, another outwardly projecting bent portion that has a different curvature than the primary one for said outwardly projecting bent portion, and an inwardly projecting bent portion that has a different curvature than the primary one for said outwardly projecting bent portion.

4. The vehicle body reinforcing member according to claim 1, wherein a cross section shape of the steel tube as a starting material for the vehicle body reinforcing member is one of a circle, an oblong, a shape that is similar to a circle, and a shape that is similar to an oblong.

5. The vehicle body reinforcing member according to claim 1, wherein the outwardly projecting bent portion is formed, while moving the steel tube as the raw material successively in the axial direction, by using a high-frequency induction heating coil that is arranged around an outer circumference of the steel tube to heat a localized portion of the steel tube to a temperature range in which plastic deformation is possible and a temperature range in which hardening is possible, then forming each of the bent portions by imparting a bending moment to the heated portion, then rapidly cooling the heated portion.

6. The vehicle body reinforcing member according to claim 1, wherein the vehicle body reinforcing member is used as an impact resistance member for a door impact bar.

7. The vehicle body reinforcing member according to claim 2, wherein the vehicle body reinforcing member is used as an impact resistance member for a door impact bar.

8. The vehicle body reinforcing member according to claim 3, wherein the vehicle body reinforcing member is used as an impact resistance member for a door impact bar.

9. The vehicle body reinforcing member according to claim 4, wherein the vehicle body reinforcing member is used as an impact resistance member for a door impact bar.

10. The vehicle body reinforcing member according to claim 5, wherein the vehicle body reinforcing member is used as an impact resistance member for a door impact bar.

11. A vehicle body reinforcing member made of a metal tube that is attached to an automobile body for impact resistance, the vehicle body reinforcing member comprising a plurality of outwardly projecting portions, the outwardly projecting portions at a plurality of locations in a lengthwise direction of the vehicle body reinforcing member; and an inwardly projecting bent portion between and adjacent to said outwardly projecting bent portions, the inwardly projecting bent portion being inwardly projecting in relation to the outer surface of the automobile body.

12. A vehicle body reinforcing member made of a metal tube that is attached to an automobile body for impact resistance, the vehicle body reinforcing member comprising:
a plurality of outwardly projecting bent portions, the outwardly projecting bent portions at a plurality of locations in a length-wise direction of the vehicle body reinforcing member, the outwardly projecting bent portions being towards an outer surface of the vehicle body; and a straight portion on one side adjacent to each of said outwardly projecting bent portions, and an inwardly projecting bent portion on the other side adjacent to each of specific outwardly projecting portions.

13. The vehicle body reinforcing member according to claim 11, wherein a primary curvature of the outwardly projecting bent portion at least at one location that receives impact from outside the vehicle body is at least $0.8 \text{ m}^{-1}$.

14. The vehicle body reinforcing member according to claim 12, wherein a primary curvature of the outwardly projecting bent portion at least at one location that receives impact from outside the vehicle body is at least $0.8 \text{ m}^{-1}$.

\* \* \* \* \*